(12) United States Patent
Dujmic

(10) Patent No.: US 12,067,760 B2
(45) Date of Patent: Aug. 20, 2024

(54) SYSTEMS AND METHODS FOR IMAGE PROCESSING

(71) Applicant: Leidos Security Detection & Automation, Inc., Tewksbury, MA (US)

(72) Inventor: Denis Dujmic, Arlington, MA (US)

(73) Assignee: Leidos Security Detection & Automation, Inc., Tewksbury, MA (US)

( * ) Notice: Subject to any disclaimer, the term of this patent is extended or adjusted under 35 U.S.C. 154(b) by 1022 days.

(21) Appl. No.: 16/537,417

(22) Filed: Aug. 9, 2019

(65) Prior Publication Data

US 2020/0051017 A1 Feb. 13, 2020

Related U.S. Application Data

(60) Provisional application No. 62/717,649, filed on Aug. 10, 2018.

(51) Int. Cl.
G06V 10/44 (2022.01)
G06F 17/18 (2006.01)
G06F 18/214 (2023.01)
G06N 3/08 (2023.01)
G06Q 10/0835 (2023.01)
G06V 10/82 (2022.01)
G06V 20/52 (2022.01)
(Continued)

(52) U.S. Cl.
CPC .......... *G06V 10/454* (2022.01); *G06F 18/214* (2023.01); *G06N 3/08* (2013.01); *G06Q 10/0835* (2013.01); *G06V 10/82* (2022.01); *G06V 20/52* (2022.01); *G06V 30/19173* (2022.01); *G06V 30/424* (2022.01); *G06F 17/18* (2013.01); *G06V 2201/05* (2022.01)

(58) Field of Classification Search
CPC ............... G06K 9/6256; G06K 9/6271; G06Q 10/0835; G06V 10/454; G06V 10/758; G06V 10/82; G06V 20/52; G06V 2201/05; G06V 30/424
See application file for complete search history.

(56) References Cited

U.S. PATENT DOCUMENTS

| 7,260,173 B2 | 8/2007 | Wakayama et al. |
| 8,180,139 B2 | 5/2012 | Basu |

(Continued)

FOREIGN PATENT DOCUMENTS

| GB | 2454782 A | 5/2009 |
| JP | 2004-177138 A | 6/2004 |

(Continued)

OTHER PUBLICATIONS

Jaccard et al: "Tackling the x-ray cargo inspection challenge using machine learning", SPIE, 2016, (Year: 2016).*

(Continued)

*Primary Examiner* — Ruiping Li
(74) *Attorney, Agent, or Firm* — McCarter & English, LLP

(57) ABSTRACT

Systems and methods for identifying objects in shipping containers using radiographic images are described. More particularly, techniques for using artificial neural networks to analyze radiographic images of shipping containers and associated cargo manifests are discussed.

44 Claims, 15 Drawing Sheets
(2 of 15 Drawing Sheet(s) Filed in Color)

(51) Int. Cl.
*G06V 30/19* (2022.01)
*G06V 30/424* (2022.01)

(56) References Cited

U.S. PATENT DOCUMENTS

| | | | |
|---|---|---|---|
| 8,290,230 | B2 | 10/2012 | Chen et al. |
| 2004/0101097 | A1 | 5/2004 | Wakayama et al. |
| 2011/0206240 | A1 | 8/2011 | Hong et al. |
| 2012/0243741 | A1 | 9/2012 | Shet et al. |
| 2013/0327948 | A1 | 12/2013 | Bendahan et al. |
| 2017/0242148 | A1* | 8/2017 | Yu .................. G06V 20/52 |
| 2018/0032857 | A1 | 2/2018 | Lele et al. |
| 2018/0089531 | A1 | 3/2018 | Geva et al. |
| 2018/0336672 | A1 | 11/2018 | Perticone et al. |
| 2021/0056677 | A1 | 2/2021 | Perticone et al. |

FOREIGN PATENT DOCUMENTS

| | | | |
|---|---|---|---|
| JP | 2009-122108 | A | 6/2009 |
| JP | 2010-230676 | A | 10/2010 |
| JP | 2010-540930 | A | 12/2010 |
| JP | 2014-525594 | A | 9/2014 |
| JP | 2017-507391 | A | 3/2017 |
| WO | 2009/045616 | A2 | 4/2009 |
| WO | 2013/036735 | A1 | 3/2013 |

OTHER PUBLICATIONS

Nam et al: "Dual Attention Networks for Multimodal Reasoning and Matching", CvF, 2017 (Year: 2017).*
Tsai et al: "Learning Robust Visual-Semantic Embeddings", ICCV, 2017 (Year: 2017).*
Suk, An Introduction to Neural Networks and Deep Learning. Deep Learning for Medical Image Analysis. Academic Press, pp. 3-24, Jan. 18, 2017.
International Search Report and Written Opinion for Application No. PCT/US2019/046014, dated Nov. 11, 2019, 17 pages.
U.S. Appl. No. 15/986,422, filed May 22, 2018, U.S. Pat. No. 10,832,391, Issued.
U.S. Appl. No. 17/093,326, filed Nov. 9, 2020, 2021-0056677, Published.
Akcay et al., Transfer Learning Using Convolutional Neural Networks for Object Classification Within X-ray Baggage Security Imagery. IEEE, International Conference on Image Processing (ICIP). pp. 1057-1061, Sep. 25-28, 2016.
Gregory et al., Deep Learning Technical Intterchange. Transportation Security Administration. Slideshow, 16 pages, Aug. 22-23, 2017.
International Search Report and Written Opinion for Application No. PCT/US2018/033874, dated Nov. 8, 2018, 14 pages.
Jaccard et al., Tackling the X-ray cargo inspection challenge using machine learning. Proceedings Anomaly Detection and Imaging with X-rays (ADIX). 2016;9847:89470N-1—98470N-13.
Perticone et al., Initial Results on Deep Convolutional Neural Network Classification of Trimat Images. 4 pages, Oct. 14, 2016.
Rogers et al., A deep learning framework for the automated inspection of complex dual-energy x-ray cargo imagery. Proceedings of SPIE, Anomoly Detection and Imaging with X-rays (ADIX) II. May 1, 2017;10187:101870L, 12 pages.
Strellis, Duke—Rapiscan Initial Successes, Deep Learning Technical Exchange. Transportation Security Administration. Slideshow 12 pages, Aug. 22-23, 2017.
Szegedy et al., Going deeper with convolutions. 12 pages, Sep. 14, 2014.
Hinton, G.E. and Salakhutdinov, R.R., Reducing the Dimensionality of Data with Neural Networks, Science, 313 (5786):504, 2006.
Mikolov, Tomas, et al. (2013), Efficient Estimation of Word Representations in Vector Space, arXiv:1301.3781.
Jaccard et al., Automated detection of smuggled high-risk security threats using Deep Learning. Cornell University, retrieved online at: https://arxiv.org/abs/1609.02805. 7 pages, Sep. 9, 2016.
Jaccard et al., Using deep learning on X-ray images to detect threats. Defence and Security Doctoral Symposium Paper, 16 pages. May 18, 2016.
Perticone, DHS Deep Learning Technical Interchange: Vendor Perspective. 1 page, Aug. 22-23, 2017.
Japanese Office Action for Application No. 2019-564499, dated Oct. 24, 2022, 6 pages.
Aytekin et al., Clustering and unsupervised anomaly detection with I2 normalized deep auto-encoder representations. arXiv: 1802.00187, 8 pages, (2018).
Ogino, Anomaly Detection System for Video Data using Machine Learning. The Institute of Electronics, Information and Communication Engineers, Technical Report, Japan. Nov. 28, 2015;115(353):5-10.
Tsai et al., Learning Robust Visual-Semantic Embeddings. Computer Vision Foundation, IEEE Xplore, pp. 3571-3580, (2017).
Japanese Office Action for Application No. 2021-531617, dated Jul. 24, 2023, 7 pages.

* cited by examiner

Refrigerators 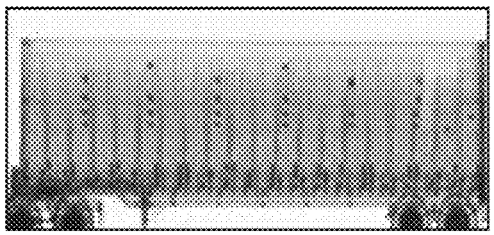
Motorcycles 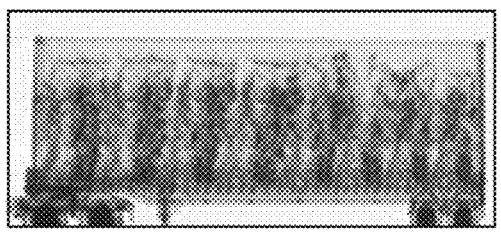
Beer 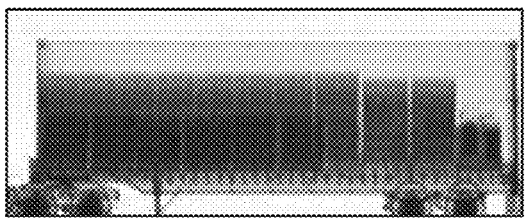
Empty 
Tobacco 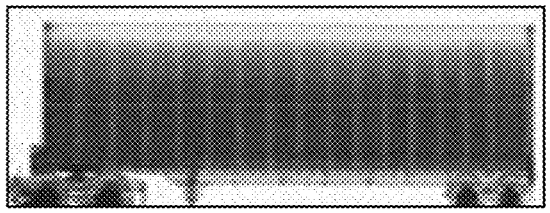
PET 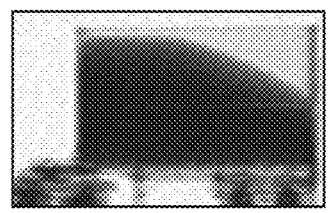
FIG. 4A

SYSTEMS AND METHODS FOR IMAGE PROCESSING

RELATED APPLICATION

This application claims priority to, and the benefit of, U.S. Provisional Patent Application No. 62/717,649, filed Aug. 10, 2018, the contents of which are incorporated herein by reference in their entirety.

BACKGROUND

Imaging technologies including radiography, computed tomography, magnetic resonance imaging (MRI), positron emission tomography (PET), and many others have found widespread use in applications as diverse as medical imaging and cargo inspection. X-ray radiography is the principal method of Non-Intrusive Inspection (NII) of cargo today and is used in conjunction with human inspections.

BRIEF SUMMARY

In one embodiment, a method for validating a cargo manifest associated with a shipping container includes receiving, at a computing device, a rendered radiographic image of a scanned shipping container from a scanner configured to scan the shipping container and render the radiographic image. The method further includes extracting, with an autoencoder neural network, a feature vector from the radiographic image and assigning a statistical probability that an object in the scanned shipping container matches a listed object on an associated cargo manifest for the scanned shipping container through comparison of the extracted feature vector against an historic distribution of prior feature vectors of radiographic images of prior shipping containers associated with cargo manifests containing a like object. Additionally, the method includes generating an automated detection indication related to the scanned shipping container based on the assigned statistical probability.

In another embodiment, a method for inspection of a designated empty shipping container includes receiving, at a computing device, a rendered radiographic image of a scanned shipping container from a scanner configured to scan the shipping container and render the radiographic image. The method also includes extracting, with an autoencoder neural network, a feature vector for each segment of the radiographic image. Additionally, the method includes assigning, a statistical probability that the extracted feature vector of the scanned shipping container matches a segment-by-segment comparison against an historic distribution of prior feature vectors of radiographic images of prior empty containers. The method further includes generating an automated detection indication related to an emptiness of the scanned shipping container based on the assigned statistical probability.

In a further embodiment, a method for validating a cargo manifest associated with a shipping container includes receiving, at a computing device, a cargo manifest for a shipping container and extracting, with a word-to-vector type of neural network, a feature vector from the cargo manifest. The method also includes assigning a statistical probability that an object listed in the cargo manifest for the shipping container is in the shipping container through comparison of the extracted feature vector against a historic distribution of prior feature vectors extracted from prior cargo manifests containing a like object. The method additionally includes generating an automated detection indication related to the shipping container based on the assigned statistical probability.

In another embodiment, a system for validating a cargo manifest associated with a shipping container includes a scanner, a computing device and an output mechanism. The scanner is configured to scan a shipping container and render at least one radiographic image. The computing device is equipped with one or more processors, communicatively coupled to the scanner and configured to receive a rendered radiographic image of a scanned shipping container from a scanner configured to scan the shipping container and render the radiographic image. The computing device is further configured to extract, with an autoencoder neural network, a feature vector from the radiographic image and assign a statistical probability that an object in the scanned shipping container matches a listed object on an associated cargo manifest for the scanned shipping container through comparison of the extracted feature vector against an historic distribution of prior feature vectors of radiographic images of prior shipping containers associated with cargo manifests containing a like object. Additionally the computing device is configured to generate an automated detection indication related to the scanned shipping container based on the assigned statistical probability. The output mechanism is configured to display graphics or generate audio based on the automated detection indication.

In a further embodiment, a system for inspection of a designated empty shipping container includes a scanner, a computing device and an output mechanism. The scanner is configured to scan a shipping container and render at least one radiographic image. The computing device is equipped with one or more processors, communicatively coupled to the scanner and configured to receive a rendered radiographic image of a scanned shipping container from a scanner configured to scan the shipping container and render the radiographic image. The computing device is further configured to extract, with an autoencoder neural network, a feature vector for each segment of the radiographic image and assign, a statistical probability that the extracted feature vector of the scanned shipping container matches a segment-by-segment comparison against an historic distribution of prior feature vectors of radiographic images of prior empty containers. Additionally, the computing device is configured to generate an automated detection indication related to an emptiness of the scanned shipping container based on the assigned statistical probability. The output mechanism is configured to display graphics or generate audio based on the automated detection indication.

In one embodiment, a scanning device for validating a cargo manifest associated with a shipping container includes one or more processors, a memory, an output mechanism and a scanner. The output mechanism includes one or more of a graphical display surface and an audio generation mechanism and the scanner is configured to scan a shipping container and render at least one radiographic image. The one or more processors are configured to execute instructions to receive a rendered radiographic image of a scanned shipping container from the scanner and extract, with an autoencoder neural network, a feature vector from the radiographic image. The one or more processors are further configured to assign a statistical probability that an object in the scanned shipping container matches a listed object on an associated cargo manifest for the scanned shipping container through comparison of the extracted feature vector against an historic distribution of prior feature vectors of radiographic images of prior shipping containers associated with cargo manifests containing a like object. Additionally, the one or more processors are configured to generate an automated detection indication related to the scanned shipping container based on the assigned statistical probability and display graphics or generate audio via the output mechanism based on the automated detection indication.

BRIEF DESCRIPTION OF THE DRAWINGS

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements). The patent or application file contains at least one drawing executed in color. Copies of this patent or patent application publication with color drawing(s) will be provided by the Office upon request and payment of the necessary fee.

The foregoing and other features and advantages provided by the present disclosure will be more fully understood from the following description of exemplary embodiments when read together with the accompanying drawings, in which:

FIGS. 4A-4C shows an output image provided by the image processing system, according to an example embodiment;

DETAILED DESCRIPTION

Figure 1:
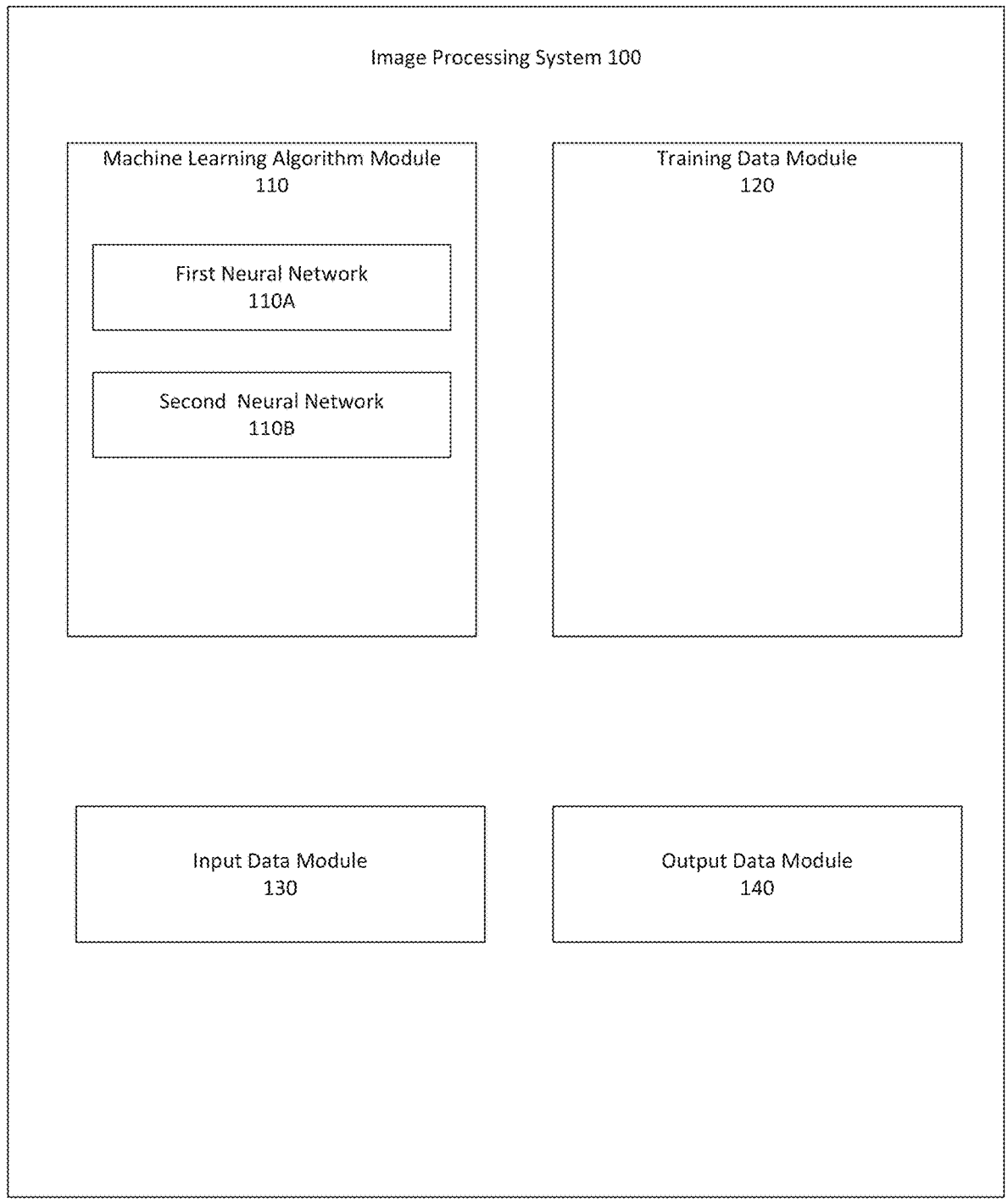
FIG. 1 is a block diagram showing an image processing system in terms of modules according to an example embodiment.

Today, images of cargo are evaluated during inspections of cargo by security personnel for threat detection, smuggling of illegal substances and evasion of customs duty. Scanners are used to assist in inspection of cargo but have traditionally been used to examine only a small percentage of cargo traffic, as scanner-rendered images conventionally still require significant human resources to properly interpret. In cases where cargo does get NII scrutiny, conventional image analysis relies on human perception, decision-making and judgment. The U.S. Customs and Border Protection agency identified operator vigilance and variability in skills between operators as the main risks that can undermine the inspection process. Embodiments of the present invention help to address these risks by introducing machine-learning algorithm(s) for cargo inspection that can replace or aid operators in order to be able to achieve 100% inspection of all cargo.

Described herein are image processing systems, methods, and computer readable media for processing images to verify container contents and identify anomalies in the images and manifests. Exemplary embodiments provide an image processing system that includes a machine-learning framework to automatically analyze the images and the manifests. In some embodiments, the images include radiographic images that may be obtained via a scanner or screening device at a security checkpoint. The shipping document, typically called the shipping manifest, is a mandatory document that accompanies a cargo container during the shipping and describes the container content and quantity, the origin, the destination, the shipper, shipping dates. The shipping document can also be the customs declaration or any similar document that can reveal the container content. As used herein, 'manifest' may denote other documents that describe cargo content in a shipping container in addition to, or in place of, a traditional shipping manifest.

One difficulty with conventional inspection approaches is the vigilance of human operators under heavy inspection load and variability in the decision between different operators. The task of a human operator is to understand the manifest text, determine the type of cargo that is being shipped, evaluate the radiographic image, and determine if the pattern in the image is consistent with the expected pattern. Inspection may be difficult as, for example, the shipping document (manifest) may contain trade names, foreign language words, and/or professional (chemistry) terms that may not be understandable to the operator. Therefore, the operator may not know the type of cargo in the container under inspection. Another challenge is to understand how the x-ray image pattern should look for a given cargo type. Containers are typically completely filled with cargo to optimize the shipping cost. Individual objects overlap with other objects in the radiographic transmission image, therefore, shapes of individual objects are often not recognizable and only the group pattern of the cargo is used to evaluate consistency. For example, an operator may recognize the shape of a single glass bottle in the radiographic image, but in a full container load of empty glass bottles individual bottle shapes are not recognizable, but the operator must rely on the group pattern.

Those skilled in art understand the difficulty of analyzing radiographic images compared to photographic images. Radiographic images are formed by creating x-rays with an x-ray source that is collimated to form a narrow fan beam, passing cargo through the beam, and detecting x-rays that pass through the cargo. Since the object image is created from x-rays that transmit through multiple cargo objects, the image contains overlapping radiographic profiles of all objects in the beam at a given time. Therefore, unlike a photographic image that shows only objects in the front, a radiographic images show multiple overlapping object that makes recognition of individual object more challenging.

In exemplary embodiments, the image processing system includes a computing device equipped with a processor in communication with a scanner, such as but not limited to an x-ray radiography scanner, configured to render radiographic images. As discussed further below, the computing device is configured to train a machine-learning algorithm(s) with a training data set that includes at least one radiographic image to generate at least one feature vector. The radiographic image includes at least one image of a test container storing objects. The test container may contain one or more objects or be empty. The objects may include one object or many objects of the same type. In exemplary embodiments, the machine-learning algorithm(s) is an autoencoder neural network (G. E. Hinton and R. R. Salakhutdinov. *Reducing the dimensionality of data with neural networks.* Science, 313(5786):504, 2006). After the machine-learning algorithm(s) is trained as described below, the computing device receives at least one rendered radiographic image from the scanner. The rendered radiographic image depicts a container that contains objects of a certain type or may be empty. In one embodiment, the computing device verifies a shipping manifest document listing the object(s) in the container, verifies that the container is empty, or identifies an object or an anomaly using the at least one feature vector. The computing device may generate an automated detection indication.

In exemplary embodiments, a machine-learning algorithm(s)(s) for image analysis of radiographic images of shipping containers is executed on a machine-learning framework or platform, for example, a machine-learning framework employing a neural network, such as, but not limited to, an autoencoder neural network. Some advantages of using autoencoder type neural network framework over other methods is that it requires a smaller number of images for training, can be trained on live data in real-time, can be used to label images, and can be used for self-learning. Accordingly, in some embodiments, the machine-learning algorithm(s) is based on an autoencoder neural network and uses radiographic images of containers for the training data. The training minimizes the difference between the input image vector and the reconstructed image in each training sample, n: $\min \Sigma_{n=1}^{N} \Delta(B \cdot A \cdot x_n, x_n)$, where A and B are the encoder and decoder parts of the network, respectively, x is the input image vector (see FIG. 3 discussed below), and $\Delta$ is Euclidean distance squared in the feature vector space that is used as the loss function in the training. Parameters of A and B are determined in the training using a standard backpropagation method. In the second part of the training, the feature vector of containers with same object type is averaged to obtain the calibration data. Object types that are averaged may include, for example, containers with beer cases, refrigerators, or motorcycles. However, the object type can be any object or objects transportable in a container.

The calibration data contains the mean, $\langle A(x) \rangle$ and the standard deviation, $\langle \langle A^2(x) \rangle \langle - \rangle A(x) \rangle^2 \rangle$, of the feature vectors for the sample, where the averaging is denoted with angle brackets. This procedure assumes that the feature parameters are described with the normal (Gaussian) distribution. If this is not the case the same-cargo sample is described with more than one mean and standard deviation such that the probability density function of the sample is approximated with a series of Gaussian approximations. In this way, even complex shapes can be described with a relatively small number of parameters.

The trained machine-learning algorithm(s) generates one or more feature vectors based on the training data set. Feature vectors are used to represent numeric or symbolic characteristics, called features, of an object in a mathematical way, and are used for pattern processing. The training data set is used to train the image processing system to identify patterns associated with the object type. The generated patterns are stored, and used to analyze feature vectors of one or more input images. The input images are images of objects obtained via a radiographic machine. Based on the feature vectors, in one embodiment, the image processing system is capable of identifying anomalies.

In some optional embodiments, a second type of machine-learning algorithm(s) is used to analyze the shipping documentation (manifest) using natural language processing algorithms. In exemplary embodiments, the algorithm is based on a word-to-vector type of neural network, also known as word embedding, (such as, but not limited to, word-to-vector types such as those described in Mikolov, Tomas; et al. (2013)). "*Efficient Estimation of Word Representations in Vector Space*". arXiv:1301.3781); see FIG. 7 discussed further below. The approach creates a dictionary of manifest words and associated labels, and finds correlation between the words and the labels. The words are transformed into a new feature vector space where correlated words have similar feature vectors (the hidden layer in FIG. 3). The training procedure minimizes the loss function, for example, defined as: $\min \Sigma_{n=1}^{N} -\log(s(y^T_n \cdot x'_n))$, where x' is the sum of output word vectors from the manifest sample n, A and B are encoder and decoder parts of the network that convert the input word vector as $x' = B \cdot A \cdot x$, and y is the word vector for a label, s is the softmax function $$e^{y^T x'} / \Sigma_j e^{x_j^T x'}.$$

The training minimizes the loss function using standard backpropagation and gradient descent methods in order to determine parameters of the matrices A and B. Those skilled in art know that instead of using raw manifest words it is better to use combination of words or word segments. Common words that appear in all cargo categories ('the', 'origin', 'destination', 'weight' . . . ) have little discriminating power and can be ignored.

The image and/or manifest processing system described herein analyze radiographic images and/or manifests to verify contents of containers and identify anomalies in the images and/or manifests. Embodiments may perform manifest verification (MV) to verify that objects listed on the manifest correspond with objects in the containers, to perform empty container verification (ECV) to verify that containers are empty, to determine a cargo type or to perform object type detection, to search for specific objects and/or threats, and/or to perform anomaly detection to search for odd patterns. Each type of analysis is explained further below.

It should be appreciated that the radiographic image analysis of shipping containers described herein may be performed in isolation or in conjunction with cargo manifest analysis. In some embodiments, the techniques for cargo manifest analysis described herein, such as, but not limited to, those using word embedding, may also be performed in isolation (i.e. without performing radiographic image analysis) to determine the contents of shipping containers.

Manifest Verification (MV)

Manifest verification (MV) attempts to verify that what is in the shipping container is the same as what the manifest indicates is supposed to be in the shipping container. MV is performed by processing the shipping manifest text with the manifest processing system and processing the radiographic image with the image processing system. Both the image and manifest processing systems derive feature vectors that are similar for the same cargo category. For example, image feature vectors for cargo with empty bottles are similar, while different from other cargo due to specific pattern that empty bottles make in the radiographic image. Description of empty bottle cargo in the manifest is similar for empty bottle shipments so the manifest feature vector is specific to this cargo category. MV compares the correlation between image and manifest feature vectors with historic data.

In some embodiments, the manifest is analyzed first to determine the cargo category. The image processing system checks image's pattern(s) for consistency with historic images for this cargo category resulting in the chi-square value, as described above. The algorithm can choose to validate shipments with chi-square value less than a threshold. The threshold can be set such that the inspection meets required false alarm rate for given verification efficiency rate. For example, an implementation of the MV algorithm requires that at 80% of manifest verification rate 70% of falsely documented cargo should be interdicted. The Receiver-Operator-Characteristics curves for 200 cargo categories of a seaport (depicted in FIG. 9) show the relationship between the efficiency and the interdiction rate.

In some embodiments, the image processing is done first in order to determine the cargo category, and the manifest processing derives a feature vector that is used to compare with the historic distribution.

In some embodiments, the cargo category is not assigned, but manifest and image feature vectors are combined into a large space. For example, image feature vector with 20-dimensional space and the manifest feature vector in 100-dimensional space are combined in a 120-dimensional space. Instead of looking for clusters separately in manifest and image spaces, a check is performed that the data is consistent with historic clean scans in 120-dimensional space. Not having to place the cargo into a category allows semi-supervised and continuous learning.

In some embodiments, the image processing system uses the feature vector to rank radiographic images for operator inspection.

In some embodiments, the image processing system determines a statistical probability that the shipping container content matches the manifest by comparing the feature vector extracted from the radiographic image of the shipping container against a historic distribution of prior feature vectors of radiographic images of prior shipping containers associated with cargo manifests listing a like object to those supposedly in the shipping container under examination. As a non-limiting example, the system 100 may generate a statistical probability of the shipping container content matching the listed objects in the associated cargo manifest based on the degree of matching between the extracted feature vector and the historic distribution of prior feature vectors using pre-determined criteria. For example an 85% match between the extracted feature vector and the historic distribution of feature vectors may directly equate to the system 100 assigning an 85% probability of the contents of the shipping container matching the associated cargo manifest or may equate to a lesser or greater probability being assigned based on previous historical data acquired by the system.

In some embodiments, the image processing system determines that a parameter quantifying the container content (e.g., objects of an object type) matches the manifest. The parameter is displayed graphically against a distribution of the historic parameters for the object type and presented to the operator.

In some embodiments, the manifest processing system helps an operator to understand the meaning of the manifest text. As mentioned before, the manifest may contain trade or professional terms that are not known to the operator. Manifest processing determines the cargo category based on the proximity of the feature vector with historic distribution of labeled cargo manifests. Cargo category determination is a part of Operator Assistance.

In some embodiments, the image processing system helps operators to understand the expected pattern in the radiographic image. As described above, containers are typically full of cargo and individual object shapes may not be recognizable, but instead operators rely on the group pattern. Image processing finds the expected image pattern for the cargo category based on historic data. Display of similar historic images is a part of an operator assistance function that may display randomly chosen historic images for this cargo category or images that are closest to the image under inspection (see FIG. 8 for example).

In some embodiments, the image processing system updates the historic distribution of feature vectors in real time with every new image.

In some embodiments, the historic distribution of feature vectors is based on less than 10 radiographic scans and corresponding manifests.

In some embodiments, the artificial neural network is an autoencoder neural network.

In some embodiments, the artificial neural network is an unsupervised neural network.

Empty Container Verification (ECV)

Empty Container Verification is performed by the image processing system described herein by inspecting radiographic images of an empty container. The image processing system receives a rendered radiographic image that includes a container that is declared empty. The image processing system divides the image into one or more segments that are analyzed using an autoencoder type neural network to extract a feature vector. The image processing system compares the feature vector against historic distribution of feature vectors for the corresponding container segment. Empty Container Verification searches for objects inside an otherwise empty container. The image processing system uses the feature vector to confirm that the declared-empty container is indeed empty.

In some embodiments, the image processing system uses the feature vector to rank radiographic images of declared-empty containers for operator inspection.

In some embodiments, the image processing system assigns a statistical probability that the container is empty.

In some embodiments, the image processing system determines a parameter quantifying that the container is empty, which is displayed graphically against a distribution of historic parameters for empty containers and presented to the operator.

In some embodiments, the image processing system updates the historic distribution of feature vectors for each segment in real time with every empty container radiographic image.

In some embodiments, the historic distribution of feature vectors is based on less than 10 radiographic scans.

Figure 10:
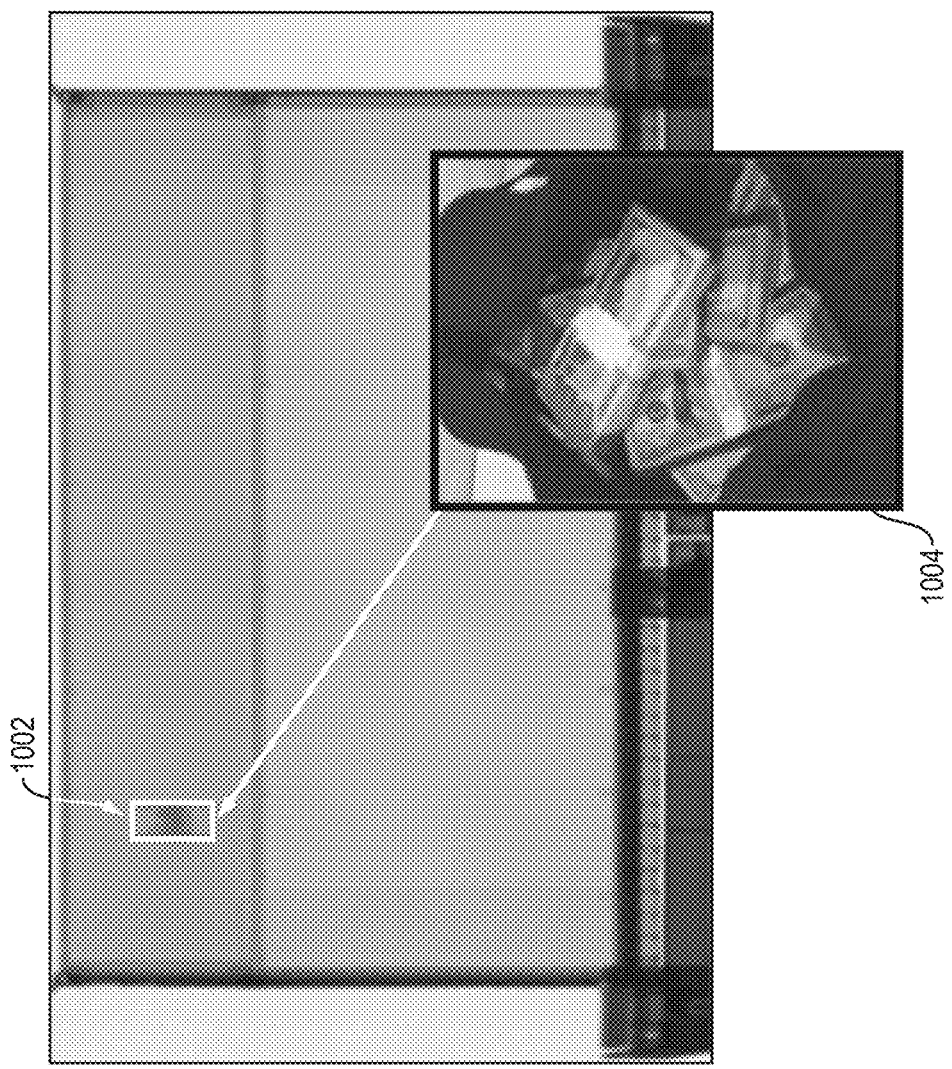
FIG. 10 illustrates an implementation of an empty container validation (ECV) algorithm that flagged a duffel bag filled with currency in a declared-empty container, in accordance with an exemplary embodiment.

In some embodiments, the objects found in declared-empty containers are marked for operator verification (see for example, FIG. 10).

Anomaly Detection

Figure 11:
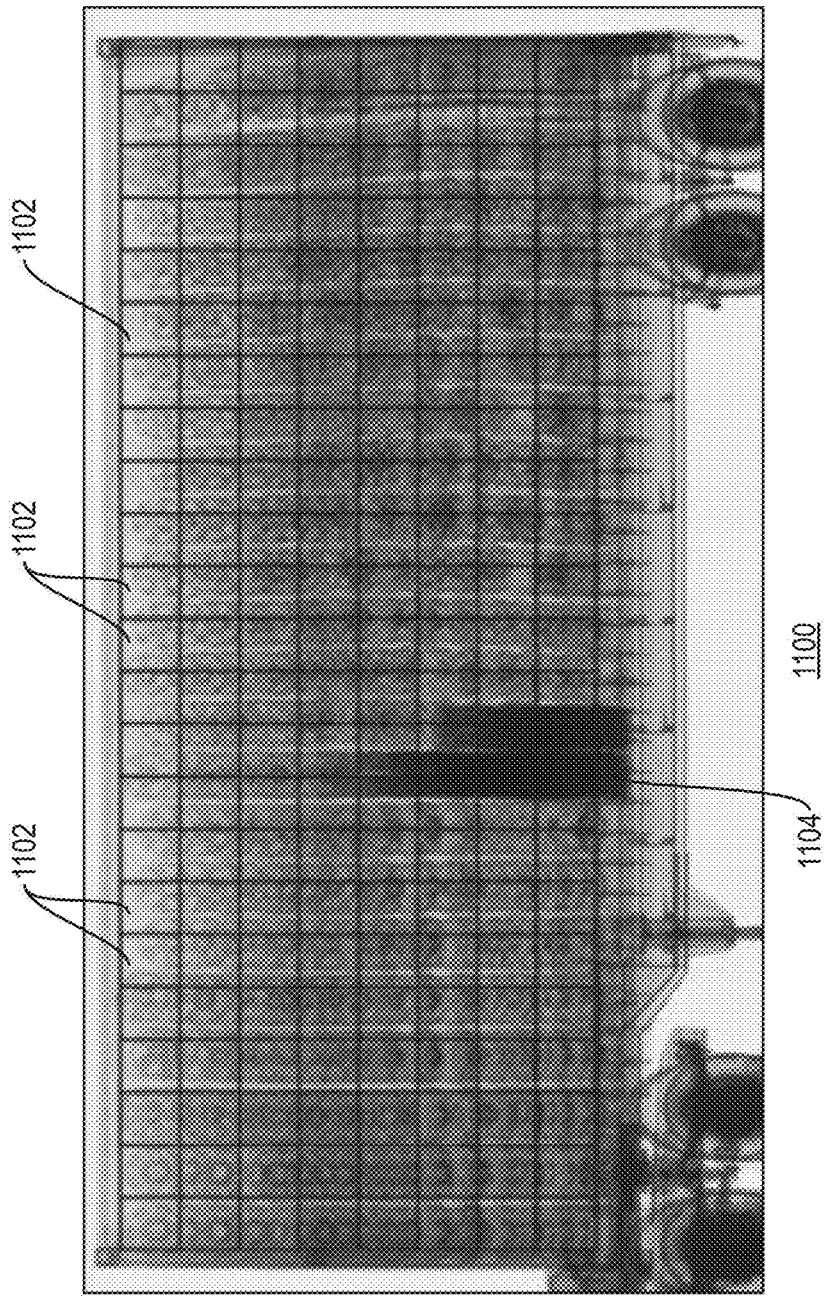
FIG. 11 illustrates container segments that are used for anomaly detection, in accordance with an exemplary embodiment.

Anomaly detection is performed by the image processing system described herein and by inspecting radiographic images of a container to detect an anomaly. The image processing system divides the image into one or more segments (for example, as shown in FIG. 11) that are analyzed using an autoencoder type neural network to extract a feature vectors for each segment. The image processing system compares each feature vector against the distribution of other feature vectors from the container. The image processing system uses the feature vector to identify segments that are significantly different from the rest of the image. For example, FIG. 12, described further below, shows chi-square difference of the feature vector from the average of other segments.

In some embodiments, the image processing system uses the feature vector to rank radiographic images for operator inspection.

In some embodiments, the image processing system assigns a statistical probability that the container segment has an anomaly.

In some embodiments, the image processing system determines a parameter quantifying a probability that the container segment has an anomaly, which is displayed graphically against the distribution of parameters for the container segments and presented to the operator.

Data Quality Monitoring

Data quality monitoring is performed by the image processing system described herein by analyzing radiographic images for data quality monitoring. The image processing system divides an image into one or more segments that are analyzed using an autoencoder type neural network to extract one or more feature vectors for each segment. The image processing system compares each feature vector against historic distribution feature vectors for the segment. The image processing system uses the feature vectors to evaluate data quality of the radiographic image such as bad detector channels, cut off images, and images with incorrect radiation dose.

Cargo Type Detection

Cargo type detection is performed by the image processing system described herein by analyzing radiographic images of one or more objects under inspection. The image processing system analyzes the images using an artificial type neural network to extract a feature vector. Each feature vector is compared against historic distribution feature vectors for the segment and the feature vectors are used to classify each of the one or more objects being scanned.

In each of the actions described above, a label may be included in an output image generated by the image processing system identifying an anomaly or object in the analyzed image. In some embodiments, the location of the anomaly or object is indicated or highlighted in an output image. In another embodiment, the image processing system may be used to visually or audibly indicate to security personnel that the container includes an anomaly and/or does not match the manifest.

Embodiments may be used in various security applications, such as but not limited to, applications where security personnel are evaluating images of containers for threat. For example, the image processing system described herein can be used by Customs and Border Protection at ports for checking containers at a security checkpoint. The image processing system may also be used by Customs and Border Protection to scan containers. The image processing system may also be used to check cargo on transport or delivery vehicles.

Having described an overview and benefits of embodiments above, more specific details of the embodiments are now provided with respect to the figures below.

Figure 5:
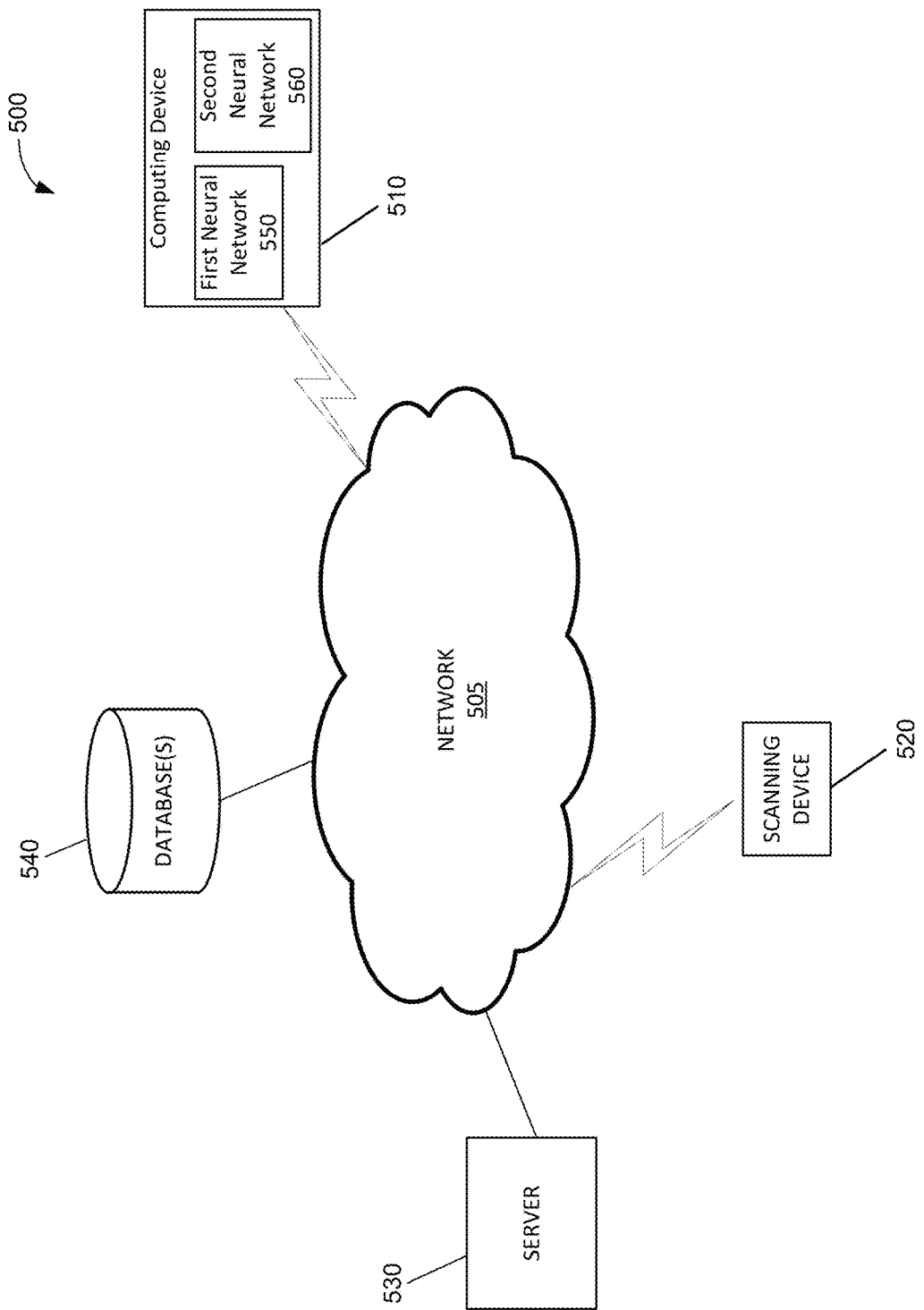
FIG. 5 illustrates a network diagram depicting a system for implementing the image processing system, according to an example embodiment.

FIG. 1 is a block diagram showing an image processing system 100 in terms of modules according to an example embodiment. One or more of the modules may be implemented using device 510, scanning device 520, server 530, and/or database 540, as shown in FIG. 5. The modules include a machine-learning algorithm module 110, a training data set module 120, an input data module 130, and an output data module 140. The modules may include various circuits, circuitry and one or more software components, programs, applications, or other units of code base or instructions configured to be executed by one or more processors. In some embodiments, one or more of modules 110, 120, 130, 140 may be included in server 530, while other of the modules 110, 120, 130, 140 are provided in device 510 or scanning device 520. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 500 (FIG. 5), such as device 510, scanning device 520, server 530, or database(s) 540.

The machine-learning algorithm module 110 may be a software and/or hardware-implemented module configured to execute or run a machine-learning algorithm(s), and may store and manage parameters, variables, data, and other components needed to execute the machine-learning algorithm(s). In an example embodiment, the machine-learning algorithm(s) is an autoencoder type neural network 110A used to perform image analysis of radiographic images of a shipping container or a recurrent neural network 110B used to perform analysis of cargo manifests associated with a shipping container.

The training data set module 120 may be a software and/or hardware-implemented module configured to manage and store a training data set for the machine-learning algorithm(s) employed by the image processing system 100. In an example embodiment, the training data set includes images of containers obtained using a radiographic screening machine or device. The images may depict containers may storing one or more objects.

The input data module 130 may be a software and/or hardware-implemented module configured to manage and store input images that are analyzed by the image processing system 100.

The output data module 140 may be a software and/or hardware-implemented module configured to manage and store the output of the machine-learning algorithm(s). In some embodiments, the output is an indication whether the input image includes an anomaly. In an example embodiment, the output is an output image indicating the presence of the anomaly by visually highlighting or emphasizing the anomaly in the output image. In one embodiment, the output image may include a label identifying the anomaly. In another example embodiment, the output is an alarm or alert generated at a security screening machine or device to indicate to an operator or security personnel that the container includes an anomaly and/or does not match the manifest based on the analysis of the images.

It should be appreciated that the modules of FIG. 1 may provide some or all of the functionality discussed above with respect to radiographic image and manifest analysis. As discussed above, in some embodiments, the machine-learning algorithm(s) is based on an autoencoder neural network and uses radiographic images of containers for the training data. The training minimizes the difference between the input image vector and the reconstructed image in each training sample, n: min $\Sigma_{n=1}^{N}\Delta(B\cdot A\cdot x_n, x_n)$, where A and B are the encoder and decoder parts of the network, respectively, x is the input image vector (see FIG. 3 discussed below), and $\Delta$ is Euclidean distance squared in the feature vector space that is used as the loss function in the training. Parameters of A and B are determined in the training using a standard back propagation method. In the second part of the training, the feature vector of containers with same object type is averaged to obtain the calibration data. Object types that are averaged may include, for example, containers with beer cases, refrigerators, or motorcycles. However, the object type can be any object or objects transportable in a container. The calibration data contains the mean, $\langle A(x) \rangle$, and the standard deviation, $\langle \langle A^2(x) \rangle - \langle A(x) \rangle^2 \rangle$, of the feature vectors for the sample, where the averaging is denoted with angle brackets. This procedure assumes that the feature parameters are described with the normal (Gaussian) distribution. If this is not the case the same-cargo sample is described with more than one mean and standard deviation such that the probability density function of the sample is approximated with a series of Gaussian approximations. In this way, even complex shapes can be described with a relatively small number of parameters.

The trained machine-learning algorithm(s) generates one or more feature vectors based on the training data set. Feature vectors are used to represent numeric or symbolic characteristics, called features, of an object in a mathematical way, and are used for pattern processing. The training data set is used to train the image processing system to identify patterns associated with the object type. The generated patterns are stored, and used to analyze feature vectors of one or more input images. The input images are images of objects obtained via a radiographic machine. Based on the feature vectors, in one embodiment, the image processing system is capable of identifying anomalies.

In some optional embodiments, a second type of machine-learning algorithm(s) is used to analyze the shipping documentation (manifest) using natural language processing algorithms. In exemplary embodiments, the algorithm is based on a word-to-vector type of neural network, also known as word embedding, (such as, but not limited to, word-to-vector types such as those described in Mikolov, Tomas; et al. (2013). "*Efficient Estimation of Word Representations in Vector Space*". arXiv:1301.3781); see FIG. 7 discussed further below. The approach creates a dictionary of manifest words and associated labels, and finds correlation between the words and the labels. The words are transformed into a new feature vector space where correlated words have similar feature vectors (the hidden layer in FIG. 3). The training procedure minimizes the loss function, for example, defined as: min $\Sigma_{n=1}^{N} -\log(s(y^T_n \cdot x'_n))$, where x' is the sum of output word vectors from the manifest sample n, A and B are encoder and decoder parts of the network that convert the input word vector as x'=B·A·x, and y is the word vector for a label, s is the softmax function $$e^{y^T x'} / \Sigma_j e^{x_j^T x'}.$$

The training minimizes the loss function using standard back propagation and gradient descent methods in order to determine parameters of the matrices A and B. Those skilled in art know that instead of using raw manifest words it is better to use combination of words or word segments. Common words that appear in all cargo categories ('the', 'origin', 'destination', 'weight' . . . ) have little discriminating power and can be ignored.

The image and/or manifest processing system described herein analyze radiographic images and/or manifests to verify contents of containers and identify anomalies in the images and/or manifests. Embodiments may perform manifest verification (MV) to verify that objects listed on the manifest correspond with objects in the containers, to perform empty container verification (ECV) to verify that containers are empty, to determine a cargo type or to perform object type detection, to search for specific objects and/or threats, and/or to perform anomaly detection to search for odd patterns.

Figure 2:
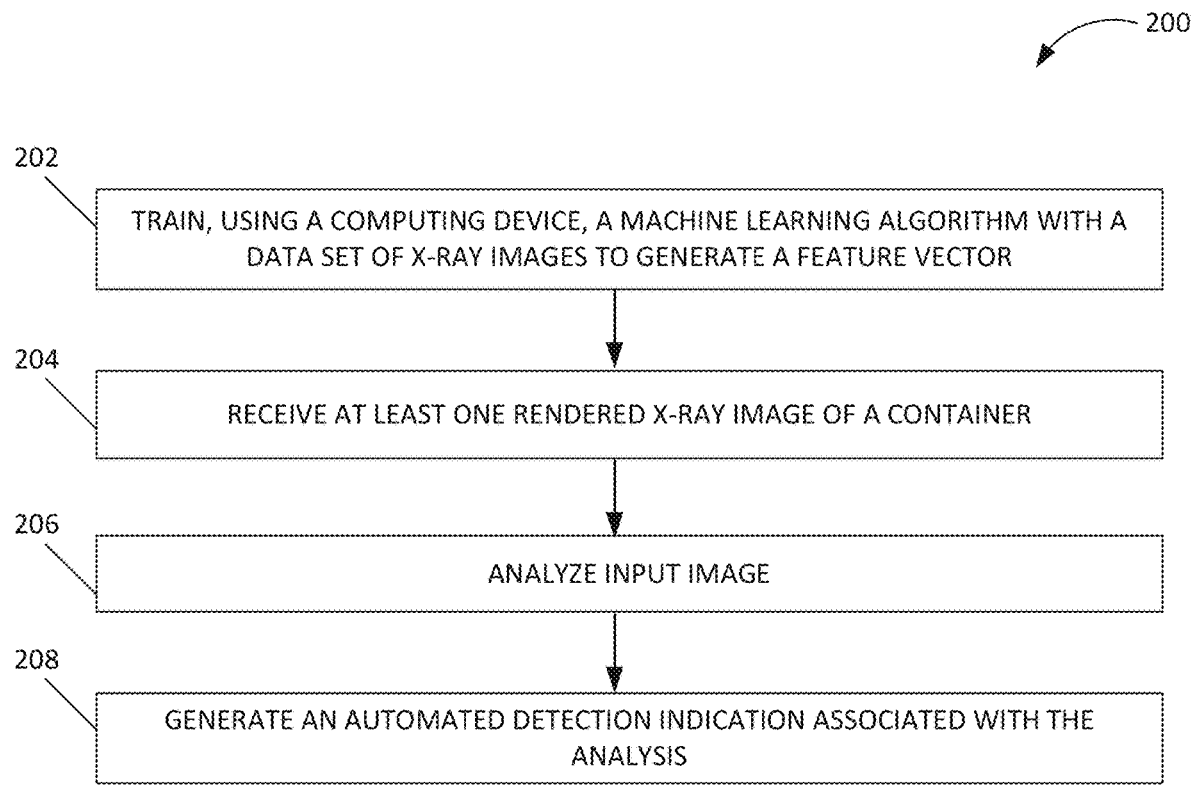
FIG. 2 is a flowchart illustrating an exemplary method employed by the image processing system, according to an example embodiment.

FIG. 2 is a flowchart illustrating an exemplary method 200 employed by the image processing system, according to an example embodiment. The method 200 may be performed using or one or more modules of system 100 described above.

At block 202, the machine-learning algorithm(s) employed in the image processing system 100 is trained to analyze a specific object type within a container using a training data set. The machine-learning algorithm module 110 may be configured to execute the machine-learning algorithm(s). The training data module 120 may be configured to provide the training data set to the machine-learning algorithm module 110 for training.

In an example embodiment, the training data set includes at least one radiographic image of a container containing a specified object type. For example, the training data set may include a radiographic image of a container containing refrigerators. The training data set can be used to train the machine-learning algorithm(s) to identify an anomaly in a radiographic image. For example, the training data set can be used to train the machine-learning algorithm(s) to determine whether a radiographic image of a container containing refrigerators contains an anomaly.

In a non-limiting example, the images for the training data set are obtained from a scanning device installed at a security checkpoint in a facility, such as a port or border control, a highway way station, and the like.

In an example embodiment, the training data set may include 2D or 3D images. In another example, the training data set may include multiple 2D images representing different layers of an object. The 2D images may be cross-sectional images or slices of an object. In yet another example, the training data set may include multiple images each representing a different perspective of an object.

At block 204, the input data module 130 receives at least one rendered radiographic image that includes a container.

In one embodiment, the image processing system 100 analyzes the input image and identifies a presence of an anomaly by dividing the input image into one or more segments that are analyzed using an autoencoder type neural network to extract feature vectors for each segment. Each feature vector is compared against the distribution of other feature vectors from this container. The feature vector is used to identify segments that are significantly different from the rest of the image.

At block 206, the machine-learning algorithm module 110 is configured to analyze the input image received at block 204, and automatically determine whether the input image is consistent with a manifest document listing the object type in the container, whether the input image is consistent with an empty container, whether the input image includes an object, or whether the input image includes an anomaly. For example, the image processing system 100 may determine that the input image includes an anomaly within a refrigerator.

At block 208, the output data module 140 generates an automated detection indication based on the analysis of step 106. For example, the automated detection indication may be associated with an anomaly identified in the input image. In an example embodiment, the automated detection indication is a text label or other graphical indication that identifies the anomaly in the input image. The automated detection indication may be displayed on or included in an output image provided at a display of a user device. The output image may be the input image (e.g., a rendered radiographic image) with an indication of the presence of the anomaly. As described herein, the user device where the output or the automated detection indication is provided to the user may include a display device communicatively coupled to security scanning device, a computing device, or a server. In another embodiment, the automated detection indication may be a visual indication indicating the location of the anomaly in the input image. Such visual indication may be a colored box shape enclosing the anomaly. In another embodiment, the automated detection indication may be a graphical indication and/or an audible indication alerting a user that an anomaly is detected in the input image. In another embodiment, the automated detection indication may indicate whether the input image is consistent with the manifest document or whether the input image is consistent with an empty container.

The automated detection indication may be transmitted to a user device or a computing device coupled to a security scanning device in a facility. In some embodiments, the security scanning device may be an x-ray screening machine at a port of entry or other secure facility. The automated detection indication may be generated and transmitted in real-time or near real-time with respect to when the input image is received at the image processing system 100.

In some embodiments, the image processing system 100 determines that the identified anomaly at block 206 is a common false-alarm anomaly for an object type. In an example embodiment, a list of common false-alarm anomalies is stored in a database. In an example embodiment, anomalies that may be identified by the image processing system but are common false-alarms anomalies may be aggregated to generate a list of common false-alarm anomalies to enable a particular machine-learning algorithm(s) to account for the false alarm anomalies.

To implement the image processing system described herein, an exemplary embodiment employs a computing device running LINUX, one or more graphics processing cards or units (GPUs), one or more images for training, and an autoencoder framework.

Figure 3:
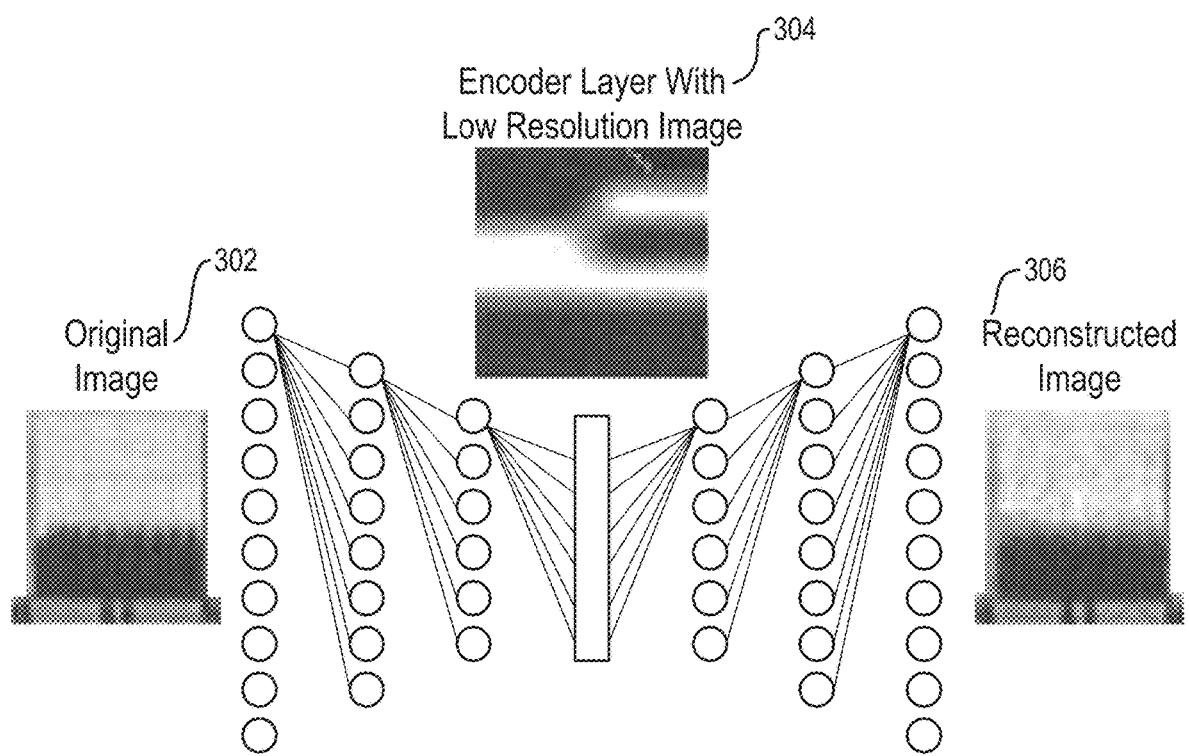
FIG. 3 illustrates an exemplary autoencoder neural network employed by the image processing system, according to an example embodiment.

FIG. 3 illustrates an exemplary autoencoder neural network topology employed by the image processing system, according to an example embodiment. An autoencoder is a neural network that has three layer stages: an input layer stage 302, a hidden (encoding) layer stage 304, and a decoding layer stage 306. The network is trained to reconstruct its inputs, which forces the hidden layer stage to try to learn good representations of the inputs. Images are reduced from the original size to a 20-dimensional feature vector through a series of hidden layers. The network is trained by expanding the feature vector to the original size and applying a loss function to restore the original image.

The mapping learned by the encoder part of the autoencoder neural network is useful for extracting features from data. Each neuron in the encoder has a set of weights associated with it, which will be tuned to respond to a particular visual feature. The features learned by the autoencoder neural network represent patterns from the digital images. The training data set is used to train the image processing system to identify patterns associated with the object type. The generated patterns are stored, and used to analyze feature vectors of one or more input images, as described above.

Figure 4B:
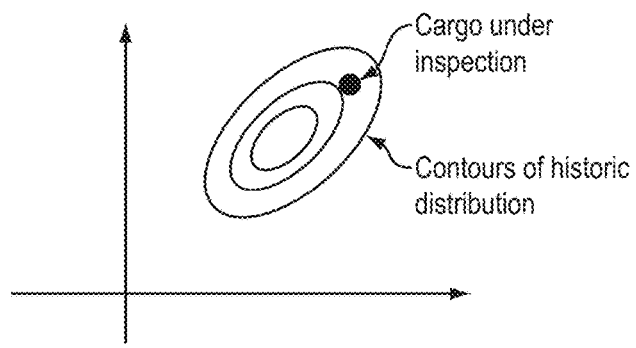
Figure 4C:
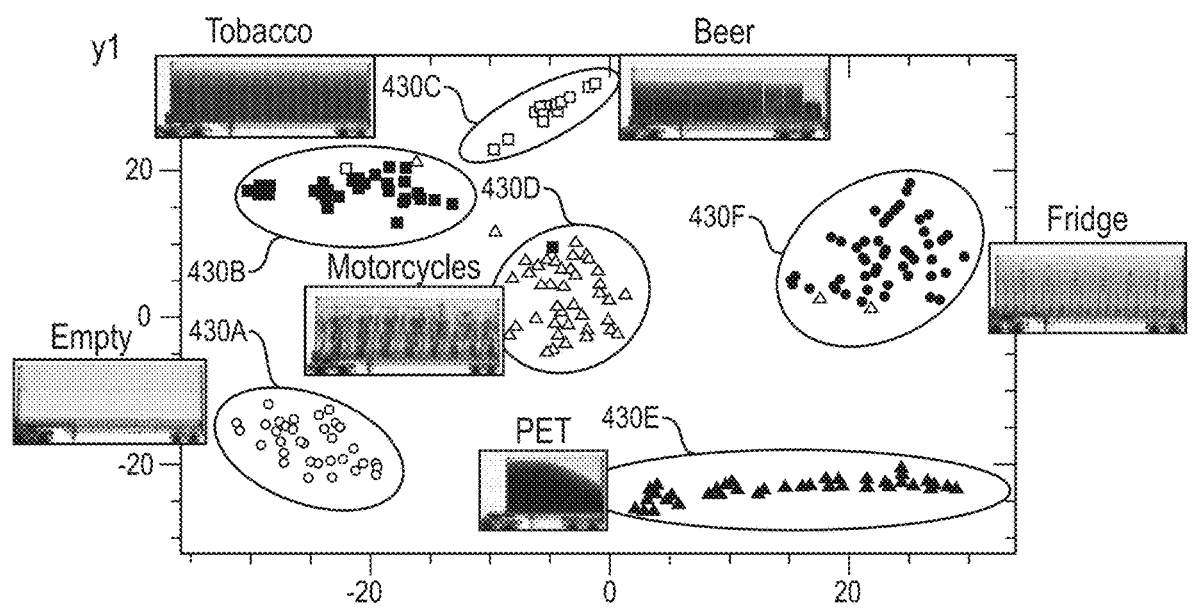

FIGS. 4A-4C shows an output image provided by the image processing system, in accordance with an exemplary embodiment. FIG. 4A illustrates radiographic images 400 of containers containing common object types, including refrigerators, motorcycles, beer, tobacco, and polyethylene terephthalate (PET), and an empty container.

In order to quantify dissimilarity between object types, the system performs an image analysis using an autoencoder type neural network with topology as shown in FIG. 4B. The object type within the container under inspection is compared with contours of historic distribution of a same object type, which are then plotted as shown in FIG. 4C.

FIG. 4C shows feature vectors from around 120 image segments of four object types (tobacco, beer, refrigerators, and motorcycles) plotted on a graph, as well as image segments for an empty container and PET container. Clustering of points from the same object type 430A, 430B, 430C, 430D, 430E and 430F indicates that the object type can be distinguished based on the image features.

Container content verification can be achieved by comparing manifest data and radiographic images. In some embodiments, the system parses the manifest and automatically verifies that the image pattern matches objects listed in the manifest. In other embodiments, operators at security checkpoints may receive radiographic images of containers and/or a manifest with content information for each container. In such an embodiment, the operator verifies that the image pattern matches objects listed in the manifest.

FIG. 5 illustrates a network diagram depicting a system 500 for implementing the image processing system, according to an example embodiment. The system 500 can include a network 505, multiple devices, for example, device 510, scanning device 520, server 530, and a database(s) 540. Each of the devices 510, 520, server 530, and database(s) 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMax network, any other type of network, or a combination of two or more such networks.

The device 510 may include, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Device 510 may connect to network 505 via a wired or wireless connection.

The scanning device 520 may include a radiographic machine or system to scan containers, and produce rendered radiographic images of scanned containers on a display device coupled to the scanning device 520. In an example embodiment, the scanning device 520 is a security screening system at a checkpoint. The scanning device 520 may be used to scan shipping containers for security purposes. In an example embodiment, the images produced by the scanning device 520 are used as the dataset to train the machine-learning algorithm(s) as described herein. In other embodiments, the scanning device 520 produces the input image for the image processing system 100. After the input image is processed, the output image may be displayed at the display device coupled to the scanning device 520, where the output image may include a label for an anomaly and an indication of the location of the anomaly within the image.

As an add-on module, the image processing system described herein can be loaded as a software module onto an existing security checkpoint device or existing server networked to one or more devices. The image processing system generates an alarm and alerts the operator of the security checkpoint device to detected anomalies, in addition to any other detection technology that may be installed on those devices or servers.

One schooled in the art can appreciate that the add-on capability may be added to a variety of radiographic imaging devices. In this way, the alerts generated by the image processing system add-on described herein may be displayed on the screen along with alarms generated by other detection software.

In an example embodiment, the devices 510, 520 may perform one or more of the functionalities of the image processing system 100 described herein. The device 510, 520 can include one or more components of computing device 500 of FIG. 5. The device 510, 520 may be used to train the machine-learning algorithm(s), and then use the trained algorithm on input images to identify presence of an anomaly. For example, device 510, 520 may store and execute first neural network 550 to perform radiographic image analysis and second neural network 560 to perform cargo manifest analysis for a shipping container.

In an example embodiment, the image processing system 100 may be included on the server 530, and the server 530 performs one or more of the functionalities of the image processing system 100 described herein. In some embodiments, the devices 510, 520 may perform some of the functionalities, and the server 530 performs the other functionalities described herein.

Each of the database(s) 540 and server 530 is connected to the network 505 via a wired or wireless connection. Server 530 includes one or more computers or processors configured to communicate with devices 510, 520 via network 505. The server 530 can include one or more components of device 600 of FIG. 6. Server 530 hosts one or more applications or websites, including the image processing system described herein, accessed by devices 510, 520 and/or facilitates access to the content of database(s) 540. Database(s) 540 include one or more storage devices for storing data and/or instructions (or code) for use by server 530, and/or devices 510, 520. Database(s) 540 and server 530 may be located at one or more geographically distributed locations from each other or from devices 510, 520. Alternatively, database(s) 540 may be included within server 530.

Exemplary system 500 includes a first neural network 550 and a second neural network 560. The first neural network 550 is used to extract feature vectors from radiographic images, as described herein. The second neural network 560 is used for cargo manifest text analysis, as described herein. In some embodiments, the device 510 and/or the server 520 utilizes the first neural network 550 and/or the second neural network 560 for processing images and cargo manifests to verify container contents and/or identify anomalies in the images and cargo manifests, as described herein.

Figure 6:
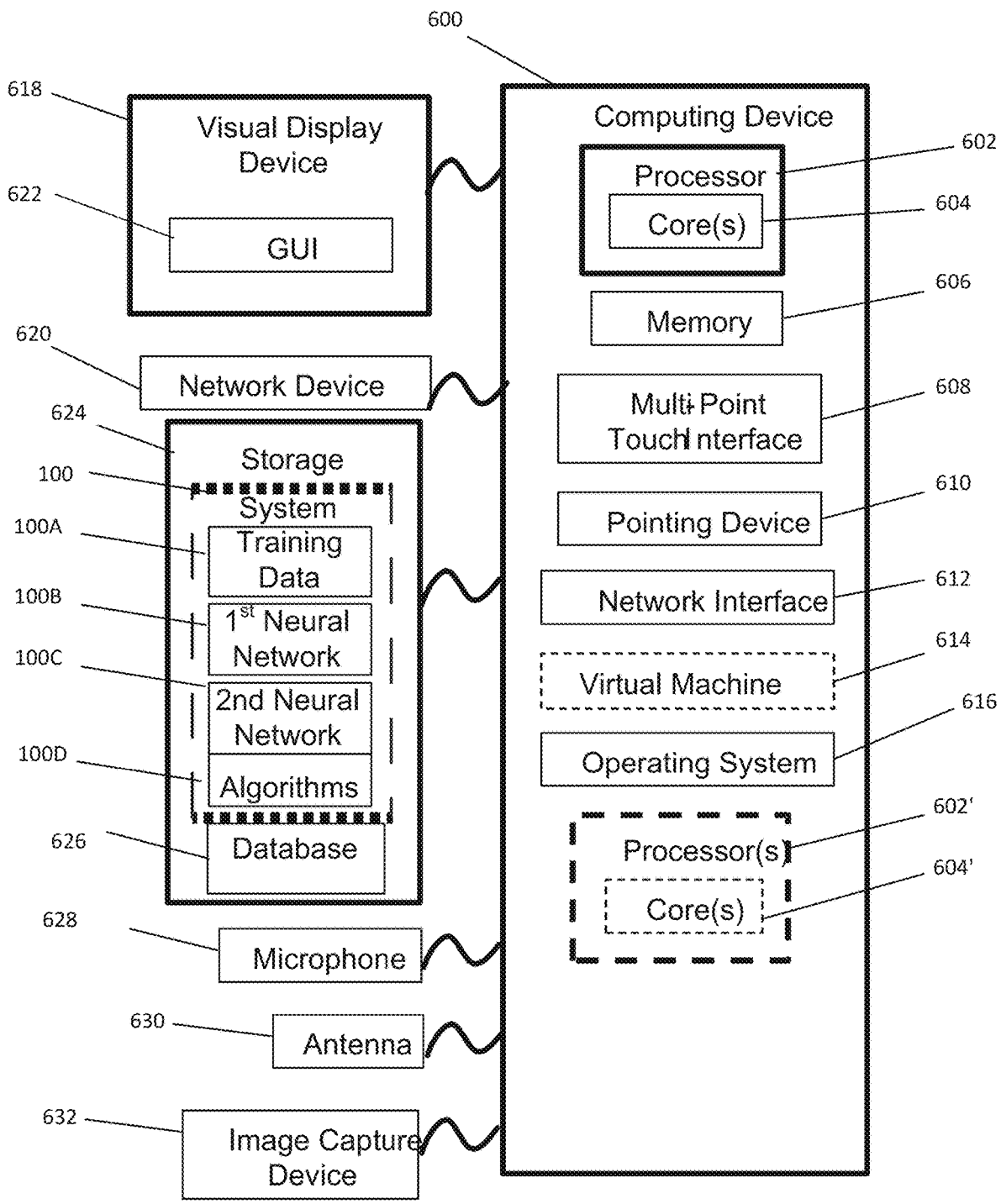
FIG. 6 is a block diagram of an exemplary computing device that can be used to perform one or more steps of the methods provided by exemplary embodiments.

FIG. 6 is a block diagram of an exemplary computing device 600 that can be used to perform one or more steps of the methods provided by exemplary embodiments. For example, computing device 600 may be, but is not limited to device 510, 520 and server 530 as described in FIG. 5. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor. The computing device 600 also includes a graphics processing unit (GPU) 605. In some embodiments, the computing device 600 includes multiple GPUs.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof. A user can interact with the computing device 600 through a visual display device 618, such as a touch screen display or computer monitor, which can display one or more user interfaces 616. The visual display device 618 can also display other aspects, elements and/or information or data associated with exemplary embodiments. The computing device 600 can include other I/O devices for receiving input from a user, for example, a keyboard or any suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

The computing device 600 can also include one or more storage devices 624, such as a hard-drive, CD-ROM, or other computer readable media, for storing data and computer-readable instructions and/or software, such as one or more modules of the system 100 shown in FIG. 1 that implements exemplary embodiments of the notification system as described herein, or portions thereof, which can be executed to generate user interface 616 on display 618. Exemplary storage device 624 can also store one or more databases for storing any suitable information required to implement exemplary embodiments. The databases can be updated by a user or automatically at any suitable time to add, delete, or update one or more objects in the databases. Exemplary storage device 624 can store some or all of image processing system 100 including training data 100A, first neural network 100B, second neural network 100C and/or algorithms 110D (such as but not limited to a manifest verification algorithm, an empty container verification algorithm, a cargo type detection algorithm, an anomaly detection algorithm and/or a data quality monitoring algorithm).

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, mobile OS, Android and iOS, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

Figure 7:
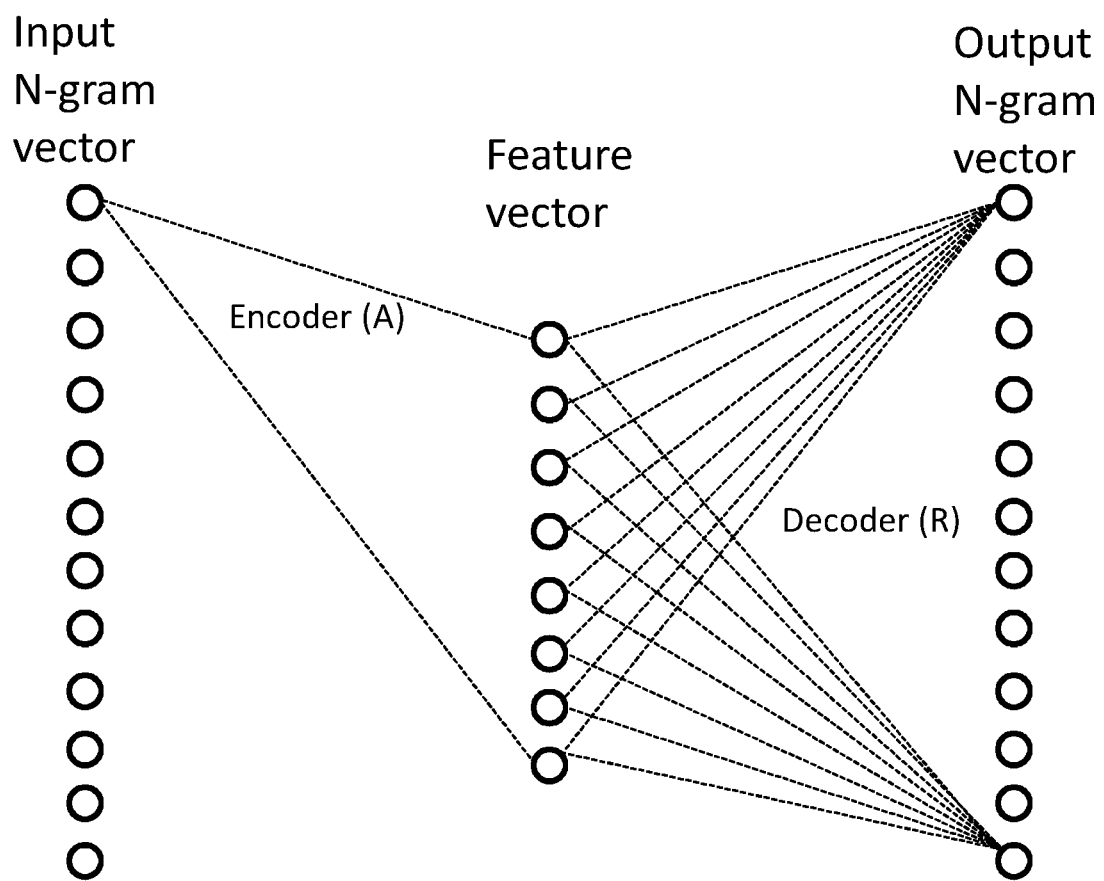
FIG. 7 illustrates an exemplary neural network architecture for cargo manifest text analysis, in accordance with an exemplary embodiment.

FIG. 7 illustrates an exemplary neural network architecture for manifest text analysis, in accordance with an exemplary embodiment. Input neurons are word segments (n-grams) found in manifest data including cargo type labels. The purpose of the neural net training is to find correlation between word segments that occur in the same context such that related words have similar feature vectors. The training uses both encoder and decoder part of the network, while the manifest evaluation uses only the encoder part that calculates the feature vector. The cargo is classified by selecting a cargo label that has closes feature vector with the average of manifest text.

Figure 8:
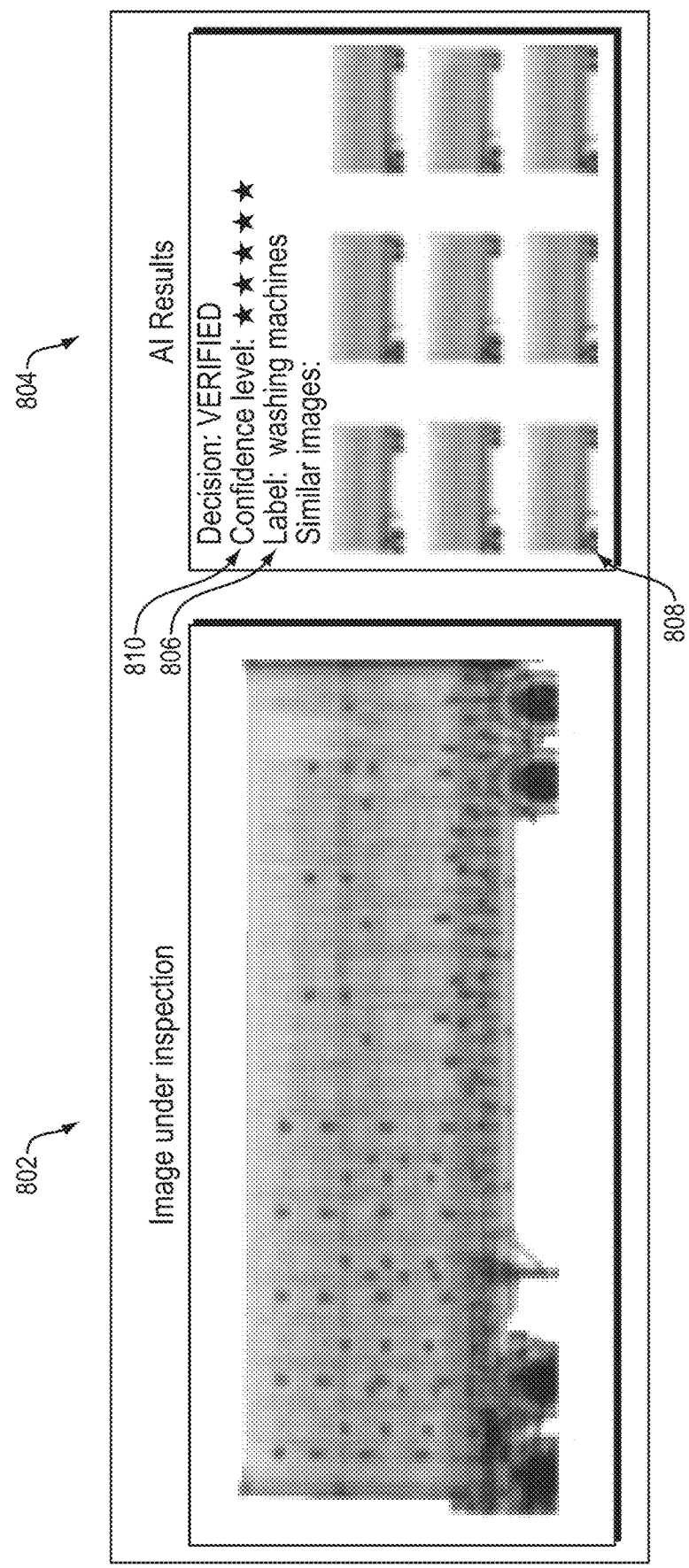
FIG. 8 illustrates an exemplary implementation of a manifest verification (MV) algorithm to assist an operator in an inspection decision, in accordance with an exemplary embodiment.

FIG. 8 illustrates an exemplary implementation of a manifest verification (MV) algorithm to assist an operator in an inspection decision, in accordance with an exemplary embodiment. The operator views an image under inspection 802 and/or raw manifest text. The MV algorithm results 804 are displayed to the operator. As shown at results 804, the MV interprets the manifest and assigns a label 806 that explains the cargo content to the operator. The MV also displays images 808 of previous scans with the same cargo content. The MV displays a confidence level 810 that the image matches the manifest. The MV algorithm results 804 are typically displayed via a user interface.

Figure 9:
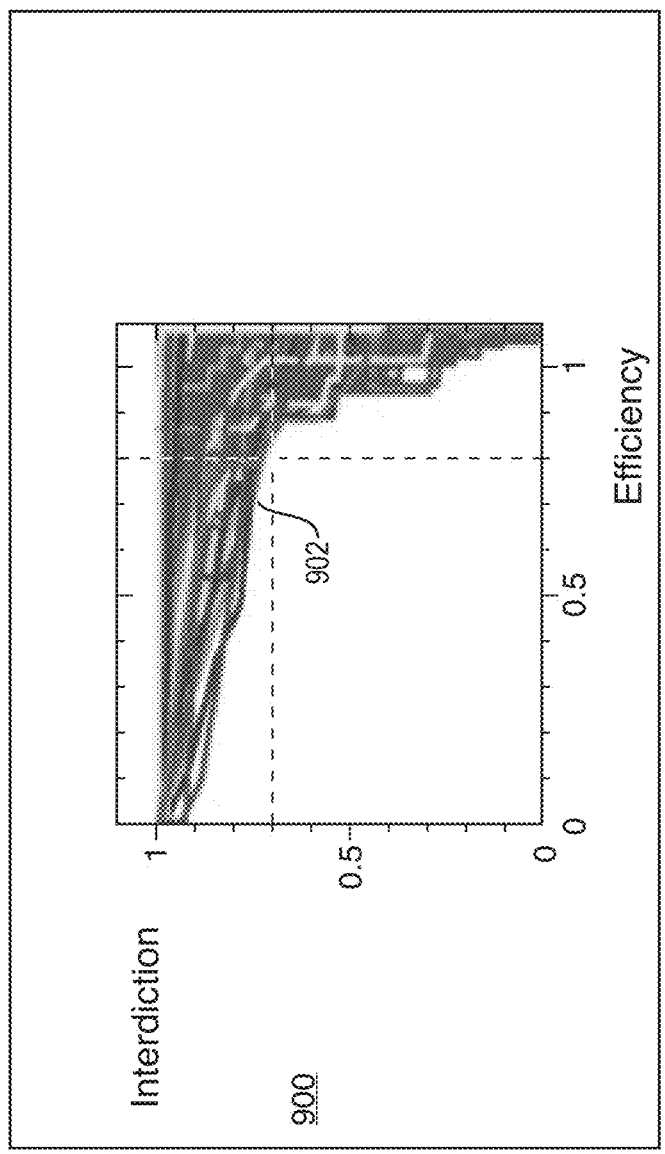
FIG. 9 illustrates a Receiver-Operator-Characteristics (ROC) curve that relates the efficiency of manifest verification to interdiction of incorrectly documented cargo, in accordance with an exemplary embodiment.

FIG. 9 illustrates an exemplary Receiver-Operator-Characteristics (ROC) curve 902 that relates the efficiency of manifest verification to interdiction of incorrectly documented cargo in accordance with an exemplary embodiment. The efficiency of manifest verification is defined as the fraction of correctly documented cargo that is cleared by the algorithm. The interdiction rate is the fraction of incorrectly documented cargo that is flagged by the algorithm. Each ROC curve belongs to a cargo category and the plot shows approximately 200 categories. In the exemplary implementation, all cargo categories have at least 70% interdiction rate at 80% of manifest clearing rate.

FIG. 10 illustrates an implementation of an empty container validation (ECV) algorithm that flagged a duffel bag filled with currency in a declared-empty container, in accordance with an exemplary embodiment. A suspect region 1002 is marked in the image for operator attention. A photograph 1004 is added to the figure to show the test target.

FIG. 11 illustrates container segments 1102 that are used for anomaly detection, in accordance with an exemplary embodiment. Each segment 1102 (as illustrated through the use of a grid overlay to explain segmentation) is evaluated with an autoencoder neural network that provides a feature vector, in accordance with an exemplary embodiment. The result is to identify segments 1102 that are significantly different from the rest of segments. As depicted in FIG. 11 some segments 1104 have been identified that indicate an anomaly.

Figure 12:
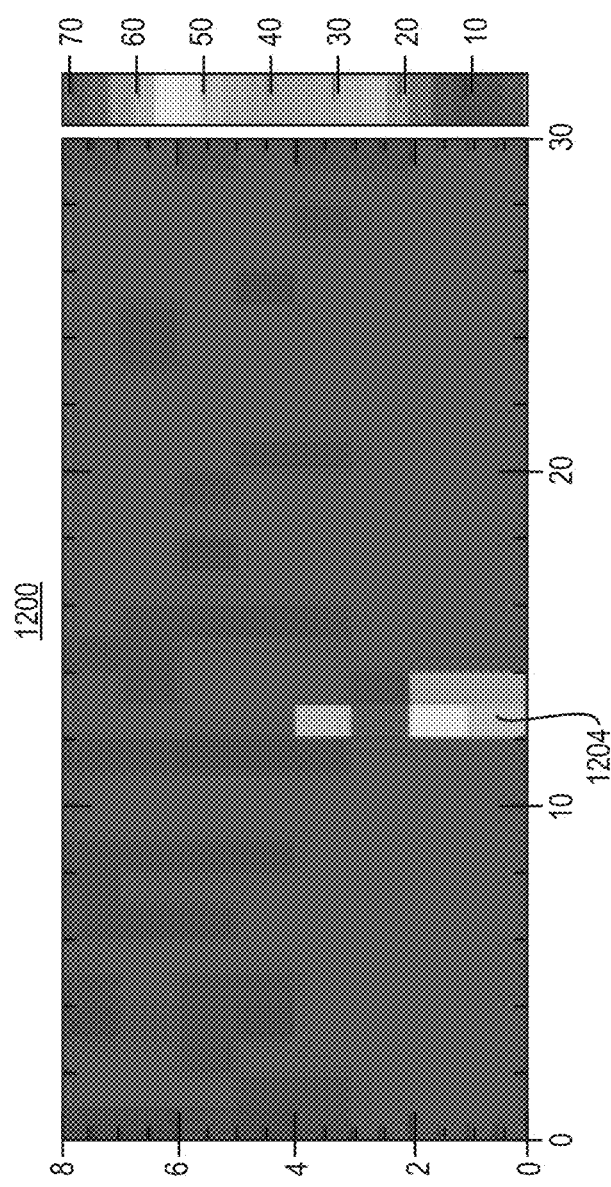
FIG. 12 illustrates results of an exemplary implementation of an anomaly detection algorithm, in accordance with an exemplary embodiment.

FIG. 12 illustrates results of an exemplary implementation of an anomaly detection algorithm, in accordance with an exemplary embodiment. The neural network generates a feature vector for each segment, and the output module makes the chi-square heat map (by comparing feature vectors). In some embodiments, colors denote chi-square values of the segment under inspection from the other segments. The chi-square is calculated as the distance-squared between the segment feature vector and the average of feature vectors of other segments, divided by the standard deviation squared of feature vectors of other segments. This chi-square is normalized to the degree of freedom i.e. the number of features minus one. The results indicate an anomaly 1204 detected in certain segments of the shipping container (as shown in FIG. 11). For instance, the anomaly may indicate an object in a container that is supposed to be empty, or a different type of object than that listed on the cargo manifest.

Figure 13:
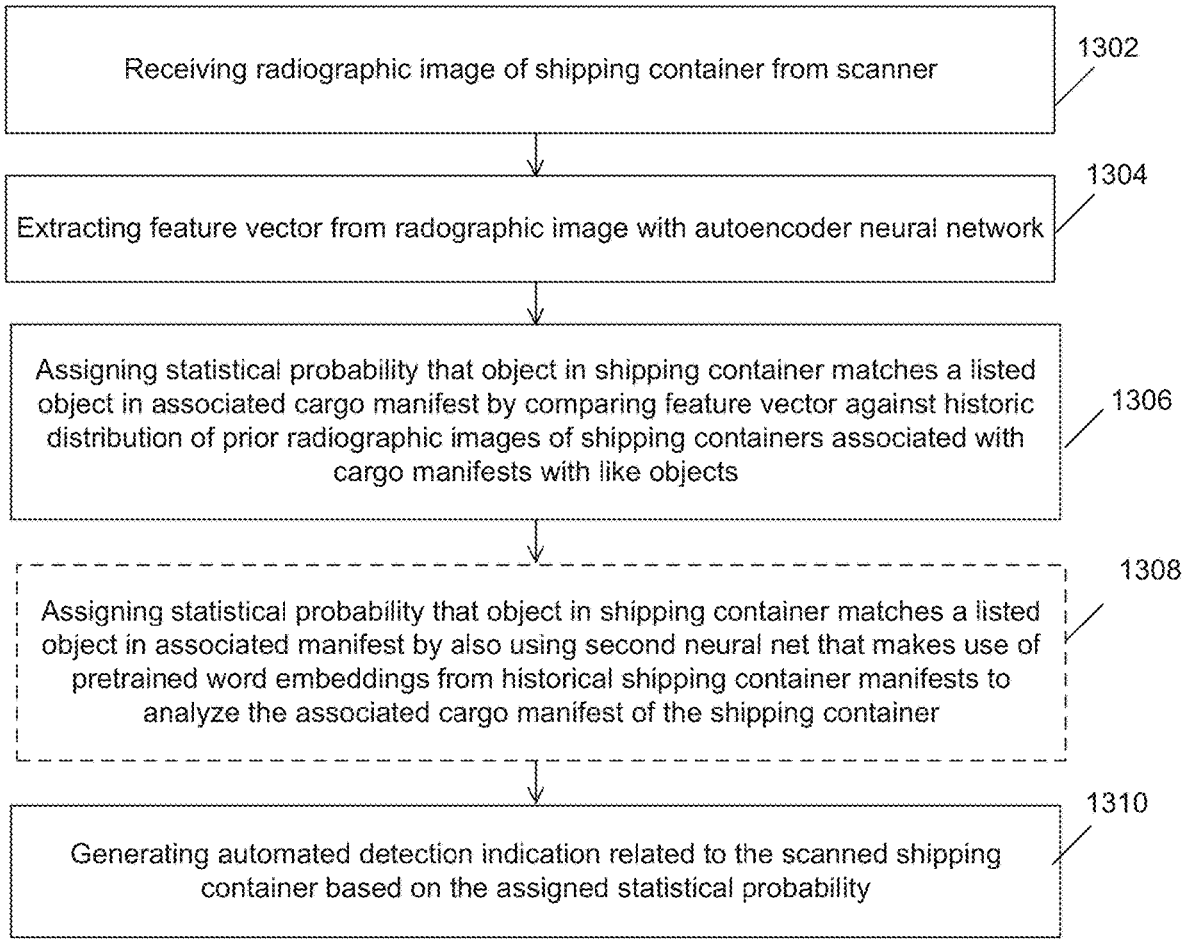
FIG. 13 is a flowchart illustrating an exemplary method employed by the image processing system, according to an example embodiment.

FIG. 13 is a flowchart illustrating an exemplary method to validate cargo manifests employed by the image processing system, according to an example embodiment. At step 1302, a computing device receives a rendered radiographic image from a scanner that includes a shipping container in the image. At step 1304, a feature vector is extracted from the radiographic image of the scanned shipping container using an autoencoder neural network. At step 1306, the image processing system assigns a statistical probability that the container matches a listed object on an associated cargo manifest for the scanned shipping container. As discussed above, in an optional step 1308, the statistical probability may be further determined by performing an additional analysis on words in cargo manifests using a second artificial neural network. In step 1310, an automated detection indication related to the scanned shipping container is then generated by the image processing system based on the assigned statistical probability. The detection indication may take a number of forms such as, but not limited to, generating warning displays or audible alarms.

Figure 14:
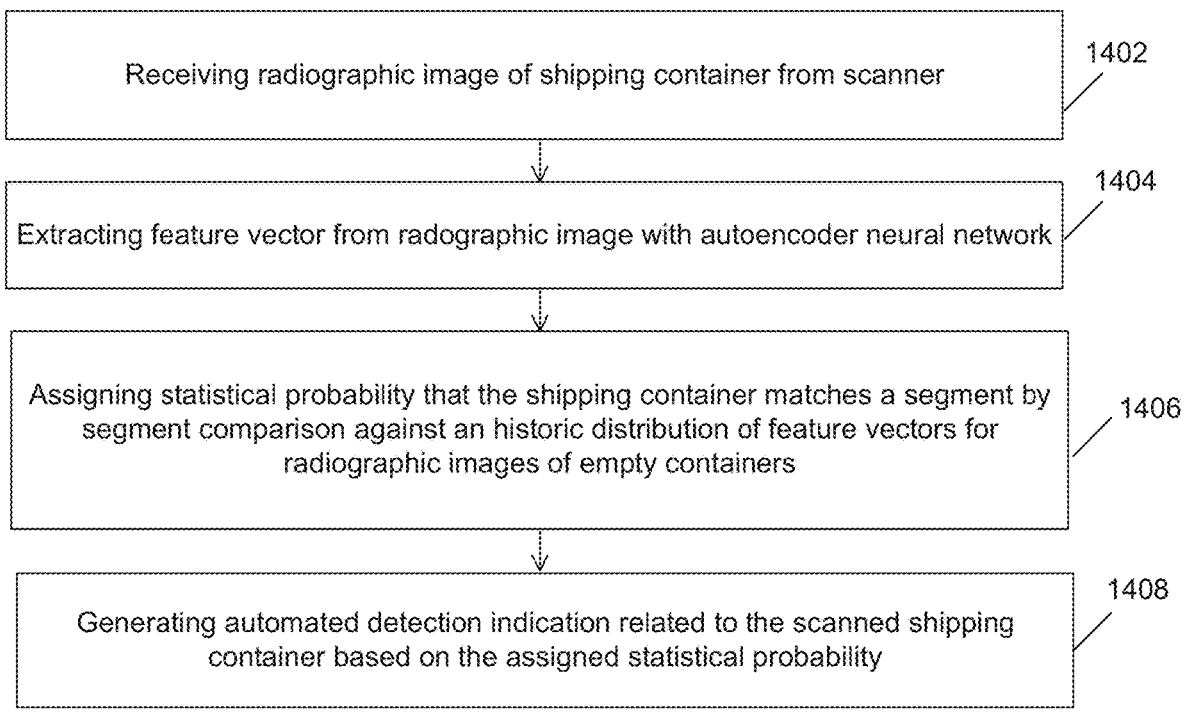
FIG. 14 is a flowchart illustrating an exemplary method employed by the image processing system to identify empty shipping containers, according to an example embodiment.

FIG. 14 is a flowchart illustrating an exemplary method employed by the image processing system to confirm that designated empty shipping containers are in fact empty, according to an example embodiment. At step 1402, a computing device receives a rendered radiographic image of a shipping container. At step 1404, a feature vector is extracted from the image using an autoencoder neural network. At step 1406, the image processing system assigns a statistical probability of the emptiness of the scanned shipping container based on comparison of the extracted feature vector against a historic distribution of feature vectors extracted from radiographic images associated with prior empty shipping containers.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components, or method steps, those elements, components, or steps may be replaced with a single element, component, or step. Likewise, a single element, component, or step may be replaced with multiple elements, components, or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other embodiments, functions, and advantages are also within the scope of the present disclosure.

I claim:

1. A computing-device implemented method for validating a cargo manifest associated with a shipping container, the method comprising:
   receiving, at one or more processors, a rendered radiographic image of a scanned shipping container from a scanner configured to scan the shipping container and render the radiographic image;
   extracting, with an autoencoder neural network, a feature vector from the radiographic image;
   receiving, at the one or more processors, a cargo manifest associated with the shipping container;
   extracting, with a natural language processing artificial neural network a feature vector for the manifest;
   comparing the extracted feature vector from the autoencoder neural network against a historic distribution of prior feature vectors of radiographic images of prior shipping containers associated with cargo manifests containing a like object;
   comparing the extracted feature vector from the natural language processing artificial neural network against a historic distribution of prior feature vectors of extracted from prior cargo manifests containing a like object;
   determining a statistical probability that an object in the scanned shipping container matches a listed object on the cargo manifest associated with the scanned shipping container based at least in part on a result of comparing the extracted feature vector from the autoencoder neural network against the historic distribution of prior feature vectors of radiographic images of prior shipping containers associated with cargo manifests containing the like object, and on a result of comparing the extracted feature vector from the natural language processing artificial neural network against the historic distribution of prior feature vectors of extracted from prior cargo manifests containing the like object; and
   generating an automated detection indication related to the scanned shipping container based on the statistical probability.

2. The method of claim 1 comprising,
   training the autoencoder neural network with a training data set of radiographic images to generate at least one prior feature vector mathematically representing numeric or symbolic characteristics of the object in the scanned shipping container, the training data set including a first set of prior radiographic images of one or more prior shipping containers holding like objects.

3. The method of claim 1, wherein the natural language processing artificial neural network is a word-to-vector type of neural network.

4. The method of claim 1, wherein the natural language processing artificial neural network makes use of pretrained word embeddings from historical prior shipping container cargo manifests to analyze the associated cargo manifest of the scanned shipping container.

5. The method of claim 1, wherein the natural language processing artificial neural network is an unsupervised recurrent neural network trained on an historical database of prior shipping container cargo manifests.

6. The method of claim 1, wherein the automated detection indication provides a graphical indicator of a degree of consistency of the content of the scanned container with the associated cargo manifest.

7. The method of claim 1, wherein the automated detection indication provides a display of a ranking of radiographic images.

8. The method of claim 1, further comprising:
   generating a graphical display of a parameter quantifying a degree to which objects in the scanned shipping container match the cargo manifest against a distribution of historic parameters for a cargo category.

9. The method of claim 1, wherein the historic distribution of prior feature vectors is updated in real-time upon receiving a new radiographic image from the scanner.

10. The method of claim 1, wherein the historic distribution of prior feature vectors is based on less than 10 radiographic image scans and corresponding cargo manifests.

11. The method of claim 1, wherein where the autoencoder neural network is an unsupervised neural network.

12. The method of claim 1, further comprising:
displaying a categorical assignment of cargo manifest validation or rejection based upon the statistical probability.

13. The method of claim 1, wherein several images of prior shipping containers associated with similar cargo manifests to that associated with the scanned shipping container are displayed in real-time.

14. The method of claim 1, wherein several prior manifests similar to that associated with the scanned shipping container are displayed in real-time.

15. A system for validating a cargo manifest associated with a shipping container, the system comprising:
a scanner configured to scan a shipping container and render at least one radiographic image;
a computing device equipped with one or more processors and communicatively coupled to the scanner, the computing device configured to:
receive a rendered radiographic image of a scanned shipping container from the scanner configured to scan the shipping container and render the radiographic image, extract, with an autoencoder neural network, a feature vector from the radiographic image,
receive, at the one or more processors, a cargo manifest associated with the shipping container;
extract, with a natural language processing artificial neural network a feature vector for the manifest;
compare the extracted feature vector from the autoencoder neural network against a historic distribution of prior feature vectors of radiographic images of prior shipping containers associated with cargo manifests containing a like object;
compare the extracted feature vector from the natural language processing artificial network against a historic distribution of prior feature vectors of extracted from prior cargo manifests containing a like object;
determine a statistical probability that an object in the scanned shipping container matches a listed object on the cargo manifest associated with the scanned shipping container based at least in part on a result of comparing the extracted feature vector from the autoencoder neural network against the historic distribution of prior feature vectors of radiographic images of prior shipping containers associated with cargo manifests containing the like object, and on a result of comparing the extracted feature vector from the natural language processing artificial neural network against the historic distribution of prior feature vectors of extracted from prior cargo manifests containing the like object;
generate an automated detection indication related to the scanned shipping container based on the assigned statistical probability; and
an output mechanism configured to display graphics or generate audio based on the automated detection indication.

16. The system of claim 15 wherein the autoencoder neural network is trained with a training data set of radiographic images to generate at least one prior feature vector mathematically representing numeric or symbolic characteristics of the object in the scanned shipping container, the training data set including a first set of prior radiographic images of one or more prior shipping containers holding like objects.

17. The system of claim 15, wherein the natural language processing artificial neural network is a word-to-vector type of neural network.

18. The system of claim 15, wherein the natural language processing artificial neural network makes use of pretrained word embeddings from historical prior shipping container cargo manifests to analyze the associated cargo manifest of the scanned shipping container.

19. The system of claim 15, wherein the natural language processing artificial neural network is an unsupervised recurrent neural network trained on an historical database of prior shipping container cargo manifests.

20. The system of claim 15, wherein the automated detection indication provides a graphical indicator of a degree of consistency of the content of the scanned container with the associated cargo manifest.

21. The system of claim 15, wherein the automated detection indication provides a display of a ranking of radiographic images.

22. The system of claim 15, wherein the computing device is further configured to:
generate a graphical display of a parameter quantifying a degree to which objects in the scanned shipping container match the cargo manifest against a distribution of historic parameters for a cargo category.

23. The system of claim 15, wherein the historic distribution of prior feature vectors is updated in real-time upon receiving a new radiographic image from the scanner.

24. The system of claim 15, wherein the historic distribution of prior feature vectors is based on less than 10 radiographic image scans and corresponding cargo manifests.

25. The system of claim 15, wherein where the autoencoder neural network is an unsupervised neural network.

26. The system of claim 15, wherein the computing device is further configured to:
display a categorical assignment of cargo manifest validation or rejection based upon the statistical probability.

27. The system of claim 15, wherein the computing device is further configured to:
display several images of prior shipping containers associated with similar cargo manifests to that associated with the scanned shipping container in real-time.

28. The system of claim 15, wherein the computing device is further configured to:
display a plurality of prior manifests similar to that associated with the scanned shipping container in real-time.

29. The system of claim 15, wherein the computing device is further configured to:
display a categorical assignment of objects listed in the associated cargo manifest.

30. A non-transitory computer readable medium storing instructions executable by one or more processors for validating a cargo manifest associated with a shipping container, wherein execution of the instructions causes a computing device to:
receive a rendered radiographic image of a scanned shipping container from a scanner configured to scan the shipping container and render the radiographic image;
extract, with an autoencoder neural network, a feature vector from the radiographic image; receive, at the one or more processors, a cargo manifest associated with the shipping container;

extract, with a natural language processing artificial neural network a feature vector for the manifest;
compare the extracted feature vector from the autoencoder neural network against a historic distribution of prior feature vectors of radiographic images of prior shipping containers associated with cargo manifests containing a like object;
compare the extracted feature vector from the natural language processing artificial network against a historic distribution of prior feature vectors of extracted from prior cargo manifests containing a like object;
determine a statistical probability that an object in the scanned shipping container matches a listed object on a cargo manifest associated with the scanned shipping container based at least in part on a result of comparing the extracted feature vector from the autoencoder neural network against the historic distribution of prior feature vectors of radiographic images of prior shipping containers associated with cargo manifests containing the like object, and on a result of comparing the extracted feature vector from the natural language processing artificial neural network against the historic distribution of prior feature vectors of extracted from prior cargo manifests containing the like object; and
generate an automated detection indication related to the scanned shipping container based on the assigned statistical probability.

31. The medium of claim 30, wherein execution of the instructions further causes the computing device to:
train the autoencoder neural network with a training data set of radiographic images to generate at least one prior feature vector mathematically representing numeric or symbolic characteristics of the object in the scanned shipping container, the training data set including a first set of prior radiographic images of one or more prior shipping containers holding like objects.

32. The medium of claim 30, wherein the natural language processing artificial neural network is a word-to-vector type of neural network.

33. The medium of claim 30, wherein the natural language processing artificial neural network makes use of pretrained word embeddings from historical prior shipping container cargo manifests to analyze the associated cargo manifest of the scanned shipping container.

34. The medium of claim 30, wherein the natural language processing artificial neural network is an unsupervised recurrent neural network trained on an historical database of prior shipping container cargo manifests.

35. The medium of claim 30, wherein the automated detection indication provides a graphical indicator of a degree of consistency of the content of the scanned container with the associated cargo manifest.

36. The medium of claim 30, wherein the automated detection indication provides a display of a ranking of radiographic images.

37. The medium of claim 30, wherein execution of the instructions further causes the computing device to:
generate a graphical display of a parameter quantifying a degree to which objects in the scanned shipping container match the cargo manifest against a distribution of historic parameters for a cargo category.

38. The medium of claim 30, wherein the historic distribution of prior feature vectors is updated in real-time upon receiving a new radiographic image from the scanner.

39. The medium of claim 30, wherein the historic distribution of prior feature vectors is based on less than 10 radiographic image scans and corresponding cargo manifests.

40. The medium of claim 30, wherein where the artificial neural network is an unsupervised neural network.

41. The medium of claim 30, wherein execution of the instructions further causes the computing device to:
display a categorical assignment of cargo manifest validation or rejection based upon the statistical probability.

42. The medium of claim 30, wherein several images of prior shipping containers associated with similar cargo manifests to that associated with the scanned shipping container are displayed in real-time.

43. The medium of claim 30, wherein several prior manifests similar to that associated with the scanned shipping container are displayed in real-time.

44. The medium of claim 30, wherein execution of the instructions further causes the computing device to:
display a categorical assignment of objects listed in the associated cargo manifest.

* * * * *